(12) United States Patent
Goyal et al.

(10) Patent No.: US 9,742,596 B2
(45) Date of Patent: Aug. 22, 2017

(54) DECISION FEEDBACK EQUALIZER ROBUST TO TEMPERATURE VARIATION AND PROCESS VARIATION

(71) Applicant: SAMSUNG ELECTRONICS CO., LTD., Suwon-si (KR)

(72) Inventors: Prateek Kumar Goyal, Suwon-si (KR); Kang-Jik Kim, Jeonju-si (KR); Jae-Hyun Park, Seoul (KR); Chang-Kyung Seong, Yongin-si (KR); Hwang-Ho Choi, Busan (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/079,185

(22) Filed: Mar. 24, 2016

(65) Prior Publication Data

US 2016/0380786 A1 Dec. 29, 2016

(30) Foreign Application Priority Data

Jun. 23, 2015 (KR) ........................ 10-2015-0089229

(51) Int. Cl.
| | |
|---|---|
| *H03H 7/30* | (2006.01) |
| *H03H 7/40* | (2006.01) |
| *H03K 7/00* | (2006.01) |
| *H04L 25/03* | (2006.01) |
| *H04L 25/06* | (2006.01) |

(52) U.S. Cl.
CPC .. *H04L 25/03057* (2013.01); *H04L 25/03885* (2013.01); *H04L 25/069* (2013.01)

(58) Field of Classification Search
CPC ......... H04L 25/03057; H04L 25/03885; H04L 25/069

See application file for complete search history.

(56) References Cited

U.S. PATENT DOCUMENTS

| | | | | |
|---|---|---|---|---|
| 5,412,309 A | * | 5/1995 | Ueunten | ................. G05F 3/267 323/303 |
| 5,587,709 A | * | 12/1996 | Jeong | ............. H03K 19/018592 341/100 |
| 6,084,452 A | * | 7/2000 | Drost | ................... H03K 5/1565 327/155 |

(Continued)

*Primary Examiner* — Daniel Washburn
*Assistant Examiner* — Amneet Singh
(74) *Attorney, Agent, or Firm* — Sughrue Mion, PLLC

(57) ABSTRACT

A decision feedback equalizer includes a positive signal line, a negative signal line, a sense amplifier, a feedback driver, a load unit, a differential driver, and a charge pump. The differential driver maintains a difference between the first voltage of the positive signal line and the second voltage of the negative signal line at a last time point of the normal period to be equal to or greater than the reference voltage by adjusting strength of the positive input current corresponding to a positive input signal and strength of the negative input current corresponding to a negative input signal based on a temperature signal. The charge pump provides a positive offset voltage and a negative offset voltage to the positive signal line and the negative signal line, respectively. The positive offset voltage and the negative offset voltage are used to maintain an average voltage of the first voltage and the second voltage at the last time point of the normal period at a first value.

20 Claims, 15 Drawing Sheets

(56) References Cited

U.S. PATENT DOCUMENTS

| | | | |
|---|---|---|---|
| 6,208,575 B1* | 3/2001 | Proebsting | G11C 7/065 |
| | | | 257/E21.659 |
| 7,539,243 B1 | 5/2009 | Toifl et al. | |
| 8,139,700 B2* | 3/2012 | Beukema | H03K 5/15013 |
| | | | 327/147 |
| 8,335,249 B1* | 12/2012 | Su | H04L 25/03878 |
| | | | 375/232 |
| 2002/0017939 A1* | 2/2002 | Okuda | G11C 7/1051 |
| | | | 327/296 |
| 2004/0245975 A1* | 12/2004 | Tran | G05F 3/30 |
| | | | 323/313 |
| 2006/0067440 A1* | 3/2006 | Hsu | H03F 1/3241 |
| | | | 375/345 |
| 2006/0188043 A1* | 8/2006 | Zerbe | H04L 1/0026 |
| | | | 375/346 |
| 2008/0137721 A1* | 6/2008 | Hsu | H04L 25/03343 |
| | | | 375/231 |
| 2010/0046683 A1* | 2/2010 | Beukema | H04L 7/0062 |
| | | | 375/355 |
| 2013/0230093 A1* | 9/2013 | Aziz | H04L 25/03057 |
| | | | 375/233 |
| 2015/0249555 A1* | 9/2015 | Mobin | H04L 25/03057 |
| | | | 375/233 |

* cited by examiner

DECISION FEEDBACK EQUALIZER ROBUST TO TEMPERATURE VARIATION AND PROCESS VARIATION

CROSS-REFERENCE TO RELATED APPLICATION

This U.S. non-provisional application claims priority from Korean Patent Application No. 10-2015-0089229, filed on Jun. 23, 2015 in the Korean Intellectual Property Office (KIPO), the disclosure of which is incorporated in its entirety herein by reference.

BACKGROUND

1. Technical Field

Apparatuses consistent with example embodiments relate to a decision feedback equalizer and more particularly to a decision feedback equalizer robust to temperature variation and process variation.

2. Discussion of the Related Art

Recently, development of semiconductor technology causes increase of a clock frequency and a data transfer rate. A waveform of data transferred through a data channel may be distorted when the data transfer rate between a memory and a memory controller increases. Inter-symbol interference (ISI) is one of reasons of the distortion. The ISI denotes a phenomenon in which currently transferred data are affected by previously transferred data because of limitation of the bandwidth of the data channel.

A decision feedback equalizer may be used to reduce ISI, however, the decision feedback equalizer may generate errors according to temperature variation and process variation.

SUMMARY

One or more example embodiments provide a decision feedback equalizer robust to temperature variation.

One or more example embodiments provide a decision feedback equalizer robust to temperature variation and process variation.

According to example embodiments, a decision feedback equalizer includes a positive signal line, a negative signal line, a sense amplifier, a feedback driver, a load unit, a differential driver, and a charge pump. The sense amplifier generates an output signal by comparing a reference voltage and a voltage difference between a first voltage of the positive signal line and a second voltage of the negative signal line at a falling edge of a clock signal. The feedback driver generates a positive feedback current and a negative feedback current based on the output signal based on the output signal. The feedback driver provides the positive feedback current and the negative feedback current to the positive signal line and the negative signal line, respectively. The load unit includes a first capacitor and a second capacitor. The first voltage is a voltage between two terminals of the first capacitor. The second voltage is a voltage between two terminals of the second capacitor. The load unit discharges the first and second capacitors during a pre-charge period. The clock signal is deactivated during the pre-charge period. The load unit charges the first capacitor with a positive input current and a first current from the positive signal line during a normal period. The clock signal is activated during the normal period. The load unit charges the second capacitor with a negative input current and a second current from the negative signal line during the normal period. The differential driver maintains a difference between the first voltage and the second voltage at a last time point of the normal period to be equal to or greater than the reference voltage by adjusting strength of the positive input current corresponding to a positive input signal and strength of the negative input current corresponding to a negative input signal based on a temperature signal generated according to detected temperature. The charge pump provides a positive offset voltage and a negative offset voltage to the positive signal line and the negative signal line, respectively, in the normal period, to maintain an average voltage of the first voltage and the second voltage at the last time point of the normal period at a first value.

In an example embodiment, the differential driver may include a current source, a first transistor, and a second transistor. A terminal of the current source may receive supply voltage, another terminal of the current source may be connected to a first node, and strength of the current source may be controlled based on the temperature signal. A source terminal of the first transistor may be connected to the first node, a gate terminal of the first transistor may receive the positive input signal, and a drain terminal of the first transistor may output the positive input current. A source terminal of the second transistor may be connected to the first node, a gate terminal of the second transistor may receive the negative input signal, and a drain terminal of the second transistor may output the negative input current.

In an example embodiment, the strength of the current source may increase according to an increase of a value of the temperature signal.

In an example embodiment, the strength of the positive input current and the strength of the negative input current may increase according to an increase of a value of the temperature signal.

In an example embodiment, the positive signal line and the negative signal line may be driven to a ground voltage during the pre-charge period.

In an example embodiment, the decision feedback equalizer may further include a temperature measurement unit configured to generate the temperature signal based on the detected temperature.

In an example embodiment, the sense amplifier may output logic high value as the output signal at the falling edge of the clock signal when a value, which is obtained by subtracting the first voltage from the second voltage, is equal to or greater than the reference voltage. The sense amplifier may output logic low value as the output signal at the falling edge of the clock signal when the value is smaller than the reference voltage.

In an example embodiment, the sense amplifier may output logic high value as the output signal at the falling edge of the clock signal when a value, which is obtained by subtracting the second voltage from the first voltage, is equal to or greater than the reference voltage. The sense amplifier may output logic low value as the output signal at the falling edge of the clock signal when the value is smaller than the reference voltage.

In an example embodiment, the load unit may include first through fourth transistors. A source terminal of the first transistor may receive the positive input current, a gate terminal of the first transistor may receive an inverted clock signal, which is an inverted signal of the clock signal, and a drain terminal of the first transistor may be connected to a first node, and the first current may be inputted to the first node through the positive signal line. A source terminal of the second transistor may receive the negative input current, a gate terminal of the second transistor may receive the inverted clock signal, and a drain terminal of the second transistor may be connected to a second node, and the second current may be inputted to the second node through the negative signal line. A drain terminal of the third transistor may be connected to the first node, a gate terminal of the third transistor may receive the inverted clock signal, and a source terminal of the third transistor may receive the ground voltage. A terminal of the first capacitor may be connected to the first node and another terminal of the first capacitor may receive the ground voltage. A drain terminal of the fourth transistor may be connected to the second node, a gate terminal of the fourth transistor may receive the inverted clock signal, and a source terminal of the fourth transistor may receive ground voltage. A terminal of the second capacitor may be connected to the second node and another terminal of the second capacitor may receive ground voltage.

In an example embodiment, the charge pump may include a current generator, a positive sub charge pump, and a negative sub charge pump. The current generator may generate an internal current based on the temperature signal. The internal current may be divided into a positive internal current and a negative internal current. The positive sub charge pump may include a third capacitor. The positive sub charge pump may charge the third capacitor with the positive internal current during the pre-charge period such that a voltage between two terminals of the third capacitor becomes the positive offset voltage. The positive sub charge pump may provide the positive offset voltage, which is charged between the two terminals of the third capacitor, to the positive signal line during the normal period. The negative sub charge pump may include a fourth capacitor. The negative sub charge pump may charge the fourth capacitor with the negative internal current during the pre-charge period such that a voltage between two terminals of the fourth capacitor becomes the negative offset voltage. The negative sub charge pump may provide the negative offset voltage, which is charged between the two terminals of the fourth capacitor, to the negative signal line during the normal period.

In an example embodiment, the positive offset voltage may be the same as the negative offset voltage.

In an example embodiment, the current generator may include a first execution block, a second execution block, a first transistor, a second transistor, a first current source, and a second current source. The first execution block may deactivate a first signal when a value of the temperature signal is equal to or greater than a reference value or the clock signal is activated. The first execution block may activate the first signal when the value of the temperature signal is smaller than the reference value and the clock signal is deactivated. A source terminal of the first transistor may receive a supply voltage, a gate terminal of the first transistor may receive the first signal, a drain terminal of the first transistor may be connected to a terminal of the first current source, another terminal of the first current source may be connected to a first node, and the internal current may be outputted to the first node. A terminal of the second current source may be connected to the first node and another terminal of the second current source may be connected to a drain terminal of the second transistor. The second execution block may activate a second signal when the value of the temperature signal is smaller than the reference value or the clock signal is activated. The second execution block may deactivate the second signal when the value of the temperature signal is equal to or greater than the reference value and the clock signal is deactivated. A gate terminal of the second transistor may receive the second signal and a source terminal of the second transistor may receive a ground voltage.

In an example embodiment, a difference between strength of the first current source and strength of the second current source may increase according to an increase of a difference between the value of the temperature signal and the reference value.

In an example embodiment, the positive sub charge pump may further include first through fourth transistors. A drain terminal of the first transistor may be connected to the positive signal line, a gate terminal of the first transistor may receive an inverted clock signal, which is an inverted signal of the clock signal, and a source terminal of the first transistor may be connected to a first node. A drain terminal of the second transistor may be connected to the first node, a gate terminal of the second transistor may receive the inverted clock signal, and a source terminal of the second transistor may receive ground voltage. A terminal of the third capacitor may be connected to the first node and another terminal of the third capacitor may be connected to a second node. A drain terminal of the third transistor may be connected to the second node, a gate terminal of the third transistor may receive the clock signal, and a source terminal of the third transistor may receive ground voltage. A drain terminal of the fourth transistor may be connected to the second node, a gate terminal of the fourth transistor may receive the clock signal, and a source terminal of the fourth transistor may receive the positive internal current.

In an example embodiment, the negative sub charge pump may further include first through fourth transistors. A drain terminal of the first transistor may be connected to the negative signal line, a gate terminal of the first transistor may receive an inverted clock signal, which is an inverted signal of the clock signal, and a source terminal of the first transistor may be connected to a first node. A drain terminal of the second transistor may be connected to the first node, a gate terminal of the second transistor may receive the inverted clock signal, and a source terminal of the second transistor may receive ground voltage. A terminal of the fourth capacitor may be connected to the first node and another terminal of the fourth capacitor may be connected to a second node. A drain terminal of the third transistor may be connected to the second node, a gate terminal of the third transistor may receive the clock signal, and a source terminal of the third transistor may receive ground voltage. A drain terminal of the fourth transistor may be connected to the second node, a gate terminal of the fourth transistor may receive the clock signal, and a source terminal of the fourth transistor may receive the negative internal current.

In an example embodiment, the feedback driver may include first through (N)-th registers (N is a natural number) and first through (N+1)-th drivers. The positive feedback current may include first through (N+1)-th positive sub feedback currents. The negative feedback current may include first through (N+1)-th negative sub feedback currents. The first register may store a first signal, which is sampled from the output signal at the falling edge of the clock signal. The (K+1)-th register (K is a natural number equal to or smaller than N) may store a (K+1)-th signal, which is sampled from a (K)-th signal at the falling edge of the clock signal. The first driver may generate the first positive sub feedback current and the first negative sub feedback current by driving the output signal in response to a first weight signal. The (K+1)-th driver may generate the (K+1)-th positive sub feedback current and the (K+1)-th negative sub feedback current by driving the (K)-th signal in response to a (K+1)-th weight signal.

According to example embodiments, a decision feedback equalizer includes first and second positive signal lines, first and second negative signal lines, a sense amplifier, a feedback driver, a first load unit, a second load unit, a differential driver, a first charge pump, and a second charge pump. The sense amplifier generates an output signal by comparing a reference voltage and a voltage difference between a first voltage of the first positive signal line and a second voltage of the first negative signal line at a falling edge of a clock signal. The sense amplifier generates the output signal by comparing the reference voltage and a voltage difference between a third voltage of the second positive signal line and a fourth voltage of the second negative signal line at a rising edge of the clock signal. The feedback driver generates a positive feedback current based on the output signal and provides the positive feedback current to the first and second positive signal lines. The feedback driver generates a negative feedback current based on the output signal and provides the negative feedback current to the first and second negative signal lines. The first load unit includes a first capacitor and a second capacitor. The first voltage is a voltage between two terminals of the first capacitor. The second voltage is a voltage between two terminals of the second capacitor. The first load unit discharges the first and second capacitors during a pre-charge period. The clock signal is deactivated during the pre-charge period. The first load unit charges the first capacitor with a positive input current and a first current from the first positive signal line during a normal period. The clock signal is activated during the normal period. The first load unit charges the second capacitor with a negative input current and a second current from the first negative signal line during the normal period. The second load unit includes a third capacitor and a fourth capacitor. The third voltage is a voltage between two terminals of the third capacitor. The fourth voltage is a voltage between two terminals of the fourth capacitor. The second load unit discharges the third and fourth capacitors during the normal period. The second load unit charges the third capacitor with the positive input current and a third current from the second positive signal line during the pre-charge period. The second load unit charges the fourth capacitor with the negative input current and a fourth current from the second negative signal line during the pre-charge period. The differential driver maintains a difference between the first voltage and the second voltage at a last time point of the normal period to be equal to or greater than the reference voltage and maintains a difference between the third voltage and the fourth voltage at a last time point of the pre-charge period to be equal to or greater than the reference voltage, by adjusting strength of the positive input current corresponding to a positive input signal and strength of the negative input current corresponding to a negative input signal based on a temperature signal generated according to detected temperature. The first charge pump provides a first positive offset voltage and a first negative offset voltage to the first positive signal line and the first negative signal line respectively, to maintain an average voltage of the first voltage and the second voltage at the last time point of the normal period at a first value independent to the temperature signal. The second charge pump provides a second positive offset voltage and a second negative offset voltage to the second positive signal line and the second negative signal line respectively. The second positive offset voltage and the second negative offset voltage maintain an average voltage of the third voltage and the fourth voltage at the last time point of the pre-charge period as the first value independent to the temperature signal.

According to example embodiments, a decision feedback equalizer includes a positive signal line and a negative signal line, a sense amplifier, a feedback driver, a load unit, a process compensator, a differential driver, and a charge pump. The sense amplifier generates an output signal by comparing a reference voltage and a voltage difference between a first voltage of the positive signal line and a second voltage of the negative signal line at a falling edge of a clock signal. The feedback driver generates a positive feedback current and a negative feedback current based on the output signal, and provides the positive feedback current and the negative feedback current to the positive signal line and the negative signal line, respectively. The load unit includes a first capacitor and a second capacitor. The first voltage is a voltage between two terminals of the first capacitor. The second voltage is a voltage between two terminals of the second capacitor. The load unit discharges the first and second capacitors during a pre-charge period. The clock signal is deactivated during the pre-charge period. The load unit charges the first capacitor with a positive input current and a first current from the positive signal line during a normal period. The clock signal is activated during the normal period. The load unit charges the second capacitor with a negative input current and a second current from the negative signal line during the normal period. The process compensator adjusts a first process compensation signal and a second process compensation signal during an initialization period until a ratio of logic high values, which are outputted as the output signal, to logic low values, which are outputted as the output signal, becomes equal to a certain ratio. A differential driver maintains a difference between the first voltage and the second voltage at a last time point of the normal period to be equal to or greater than the reference voltage by adjusting strength of the positive input current corresponding to a positive input signal and strength of the negative input current corresponding to a negative input signal based on the first process compensation signal during the initialization period, and by re-adjusting the strength of the positive input current and the strength of the negative input current based on the temperature signal, which is generated according to detected temperature, during an operation period including the pre-charge period and the normal period. The charge pump provides a positive offset voltage and a negative offset voltage to the positive signal line and the negative signal line, respectively, in the normal mode. An average voltage of the first voltage and the second voltage at the last time point of the normal period is maintained at a first value by adjusting the positive offset voltage and the negative offset voltage based on the second process compensation signal during the initialization period, and by re-adjusting the positive offset voltage and the negative offset voltage based on the temperature signal during the operation period.

In an example embodiment, the process compensator may increase values of the first and second process compensation signals when the ratio of the logic high values to the logic low values is smaller than the certain ratio. The process compensator may decrease the values of the first and second process compensation signals when the ratio of the logic high values to the logic low values is bigger than the certain ratio.

In an example embodiment, the process compensator includes a first register and a second register. The first register stores the first process compensation signal. The second register stores the second process compensation signal.

In an example embodiment, first through (M)-th positive sub input currents (M is a natural number) may be outputted as the positive input current through a first node. First through (M)-th negative sub input currents may be outputted as the negative input signal through a second node. The first process compensation signal may include first through (M)-th process compensation bit signals. The differential driver may include first through (M)-th sub differential driving blocks. The (P)-th sub differential driving block (P is a natural number equal to or smaller than M) may activate the (P)-th positive sub input current and the (P)-th negative sub input current when the (P)-th process compensation bit signal is deactivated. The (P)-th sub differential driving block may deactivate the (P)-th positive sub input current and the (P)-th negative sub input current when the (P)-th process compensation bit signal is activated. Strength of the (P)-th positive sub input current and strength of the (P)-th negative sub input current may be controlled based on the temperature signal.

In an example embodiment, the (P)-th sub differential driving block may include first through third transistors and a current source. A source terminal of the first transistor may receive supply voltage, a gate terminal of the first transistor may receive the (P)-th process compensation bit signal, a drain terminal of the first transistor may be connected to a terminal of the current source, and another terminal of the current source may be connected to a first node. A source terminal of the second transistor may be connected to the first node, a gate terminal of the second transistor may receive the positive input signal, and a drain terminal of the second transistor may output the (P)-th positive sub input current. A source terminal of the third transistor may be connected to the first node, a gate terminal of the third transistor may receive the negative input signal, and a drain terminal of the third transistor may output the (P)-th negative sub input current. Strength of the current source may be controlled based on the temperature signal.

In an example embodiment, the charge pump may include a current generator, a positive sub charge pump, and a negative sub charge pump. The current generator may generate an internal current corresponding to the temperature signal and the second process compensation signal. The internal current may be divided into a positive internal current and a negative internal current. The positive sub charge pump may include a third capacitor. The positive sub charge pump charges the third capacitor with the positive internal current during the pre-charge period such that a voltage between two terminals of the third capacitor becomes the positive offset voltage. The positive sub charge pump may provide the positive offset voltage, which is charged between the two terminals of the third capacitor, to the positive signal line during the normal period. The negative sub charge pump may include a fourth capacitor. The negative sub charge pump charges the fourth capacitor with the negative internal current during the pre-charge period such that a voltage between two terminals of the fourth capacitor becomes the negative offset voltage. The negative sub charge pump may provide the negative offset voltage, which is charged between the two terminals of the fourth capacitor, to the negative signal line during the normal period.

In an example embodiment, the current generator may include a first execution block, a second execution block, and first through (Q)-th current generating blocks (Q is a natural number). The second process compensation signal may include first through (Q)-th process compensation bit signals and first through (Q)-th sub internal currents may be outputted as the internal current through a first node. The first execution block may deactivate a first signal when a value of the temperature signal is equal to or greater than a reference value or the clock signal is activated. The first execution block may activate the first signal when the value of the temperature signal is smaller than the reference value and the clock signal is deactivated. The second execution block may activate a second signal when the value of the temperature signal is smaller than the reference value or the clock signal is activated. The second execution block may deactivate the second signal when the value of the temperature signal is equal to or greater than the reference value and the clock signal is deactivated. The (R)-th current generating block (R is a natural number equal to or smaller than Q) may activate the (R)-th sub internal current based on the first and second signals when the (R)-th process compensation bit signal is deactivated. The (R)-th current generating block may deactivate the (R)-th sub internal current when the (R)-th process compensation bit signal is activated. Strength of the (R)-th sub internal current may be controlled based on the temperature signal.

In an example embodiment, the (R)-th current generating block may include a first current source, a second current source, and first through fourth transistors. A source terminal of the first transistor may receive a supply voltage, a gate terminal of the first transistor may receive the (R)-th process compensation bit signal, and a drain terminal of the first transistor may be connected to a source terminal of a second transistor. A gate terminal of the second transistor may receive the first signal, a drain terminal of the second transistor may be connected to a terminal of the first current source, another terminal of the first current source may be connected a second node, and the (R)-th sub internal signal may be outputted to the second node. A terminal of the second current source may be connected to the second node and another terminal of the second current source may be connected to a source terminal of the third transistor. A gate terminal of the third transistor may receive the second signal and a drain terminal of the third transistor may be connected to a drain terminal of the fourth transistor. A gate terminal of the fourth transistor may receive an inverted signal of the (R)-th process compensation bit signal, and a source terminal of the fourth transistor may receive ground voltage. Strength of the first current source and strength of the second current source may be controlled based on the temperature signal.

According to example embodiments, a decision feedback equalizer includes a sense amplifier, a differential driver, and a charge pump. The sense amplifier generates an output signal based on comparison between a reference voltage and a voltage difference between a first voltage of a positive signal line and a second voltage of a negative signal line at a first edge of a clock signal, wherein the first voltage and the second voltage are discharged during a pre-charge period in which the clock signal is deactivated, the first voltage is charged using a first current from the positive signal line and a positive input current corresponding to a positive input signal during a normal period in which the clock signal is activated, and the second voltage is charged using a second current from the negative signal line and a negative input current corresponding to a negative input signal during the normal period. The differential driver adjusts strength of the positive input current and strength of the negative input current by using a temperature signal that is generated based on detected temperature, and maintains a difference between the first voltage and the second voltage at a last time point of the normal period to be equal to or greater than the reference voltage. The charge pump provides a positive offset voltage and a negative offset voltage to the positive signal line and the negative signal line, respectively, in the normal period, the positive offset voltage and the negative offset voltage being adjusted based on the temperature signal.

In an example embodiment, the decision feedback equalizer may further include a feedback driver configured to provide a positive feedback current and a negative feedback current to the positive signal line and the negative signal line, respectively, based on the output signal.

In an example embodiment, the differential driver may increase the strength of the positive input current and the strength of the negative input current according to an increase of a value of the temperature signal.

In an example embodiment, the differential driver may further adjust the strength of the positive input current and the strength of the negative input current based on a first process compensation signal during an initialization period, and the charge pump may further adjust the positive offset voltage and the negative offset voltage based on a second process compensation signal during the initialization period.

In an example embodiment, the decision feedback equalizer may further include a process compensator configured to adjust the first process compensation signal and the second process compensation signal during the initialization period until a ratio of logic high values of the output signal to logic low values of the output signal becomes a certain ratio.

BRIEF DESCRIPTION OF THE DRAWINGS

The above and/or other aspects will be more apparent by describing certain example embodiments with reference to the accompanying drawings.

DETAILED DESCRIPTION

Figure 1:
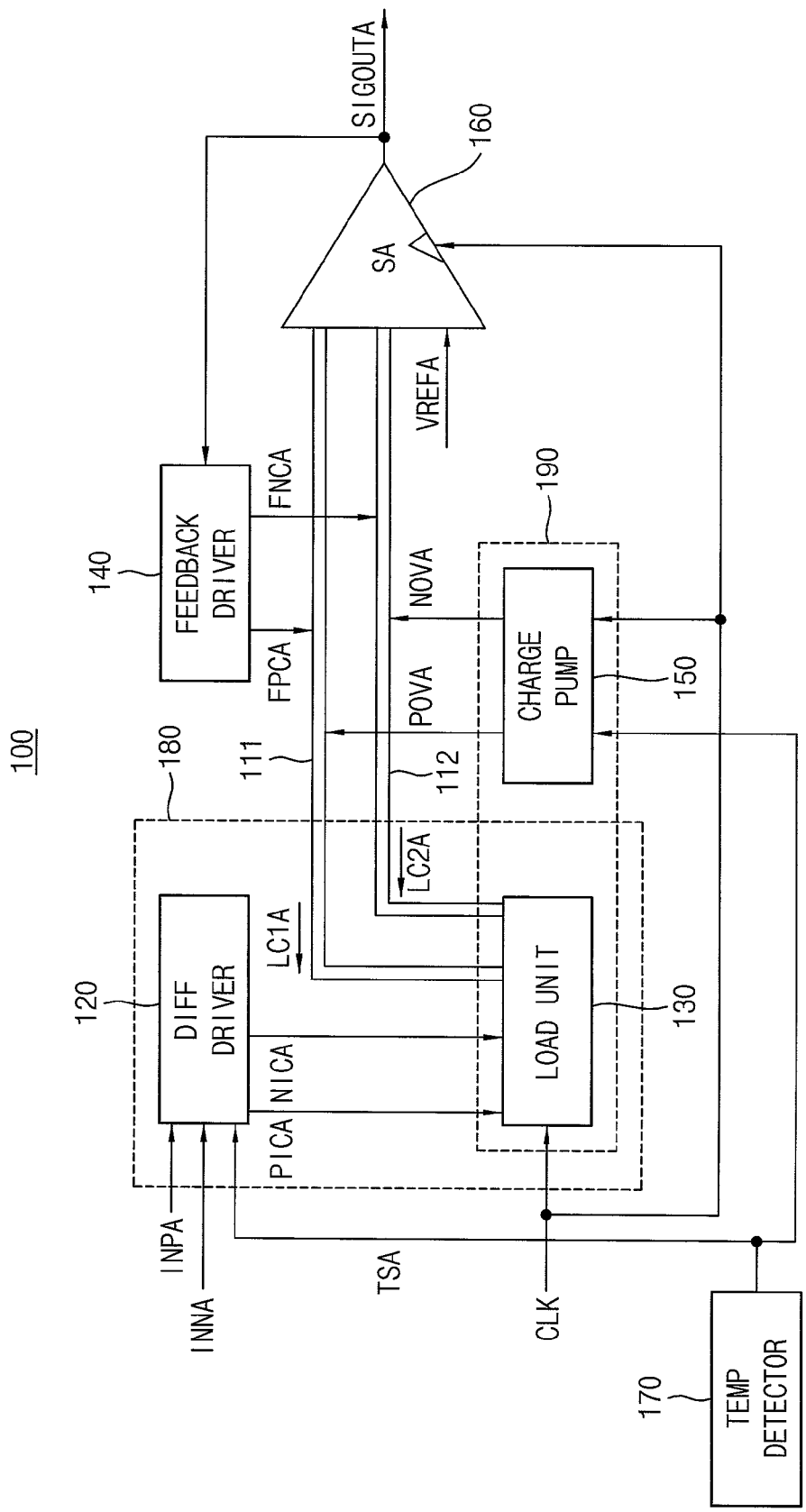
FIG. 1 is a block diagram illustrating a decision feedback equalizer according to an example embodiment.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a decision feedback equalizer according to an example embodiment.

Referring to FIG. 1, a decision feedback equalizer 100 includes a positive signal line 111, a negative signal line 112, a sense amplifier 160, a feedback driver 140, a load unit 130, a differential driver 120, and a charge pump 150. A first circuit 180 of the decision feedback equalizer 100 includes the differential driver 120 and the load unit 130. The second circuit 190 of the decision feedback equalizer 100 includes the load unit 130 and the charge pump 150.

The sense amplifier 160 generates an output signal SIGOUUTA by comparing a reference voltage VREFA and a voltage difference between a first voltage of the positive signal line 111 and a second voltage of the negative signal line 112 at a falling edge of a clock signal CLK.

In an example embodiment, the sense amplifier 160 may output a logic high value as the output signal SIGOUTA at the falling edge of the clock signal CLK when a value, which is obtained by subtracting the first voltage from the second voltage, is equal to or greater than the reference voltage VREFA. The sense amplifier 160 may output a logic low value as the output signal SIGOUTA at the falling edge of the clock signal CLK when the value is smaller than the reference voltage VREFA.

In another example embodiment, the sense amplifier 160 may output a logic high value as the output signal SIGOUTA at the falling edge of the clock signal CLK when a value, which is obtained by subtracting the second voltage from the first voltage, is equal to or greater than the reference voltage VREFA. The sense amplifier 160 may output a logic low value as the output signal SIGOUTA at the falling edge of the clock signal CLK when the value is smaller than the reference voltage VREFA.

The feedback driver 140 generates a positive feedback current FPCA and a negative feedback current FNCA based on the output signal SIGOUTA. The feedback driver 140 provides the positive feedback current FPCA and the negative feedback current FNCA to the positive signal line 111 and the negative signal line 112, respectively.

The load unit 130 includes a first capacitor and a second capacitor. The first voltage is a voltage between two terminals of the first capacitor. The second voltage is a voltage between two terminals of the second capacitor. The load unit 130 discharges the first and second capacitors during a pre-charge period. The clock signal CLK is deactivated during the pre-charge period. The load unit 130 charges the first capacitor with a positive input current PICA from the differential driver 120 and a first current LC1A from the positive signal line 111 during a normal period. The clock signal CLK is activated during the normal period. The load unit 130 charges the second capacitor with a negative input current NICA from the differential driver 120 and a second current LC2A from the negative signal line 112 during the normal period.

The differential driver 120 maintains a difference between the first voltage and the second voltage at a last time point of the normal period to be equal to or greater than the reference voltage VREFA by adjusting strength of the positive input current PICA corresponding to a positive input signal INPA and adjusting strength of the negative input current NICA corresponding to a negative input signal INNA based on a temperature signal TSA.

The charge pump 150 provides a positive offset voltage POVA and a negative offset voltage NOVA to the positive signal line 111 and the negative signal line 112, respectively. The positive offset voltage POVA and the negative offset voltage NOVA respectively maintain an average voltage of the first voltage and the second voltage at the last time point of the normal period at a first value irrespective to the temperature signal TSA.

In an example embodiment, the positive signal line 111 and the negative signal line 112 may be driven to a ground voltage during the pre-charge period.

In an example embodiment, the decision feedback equalizer 100 may further include a temperature detector 170 which generates the temperature signal TSA based on detected temperature. For example, the temperature detector 170 may generate the temperature signal TSA to have an increased value according to an increase of the detected temperature.

Figure 2:
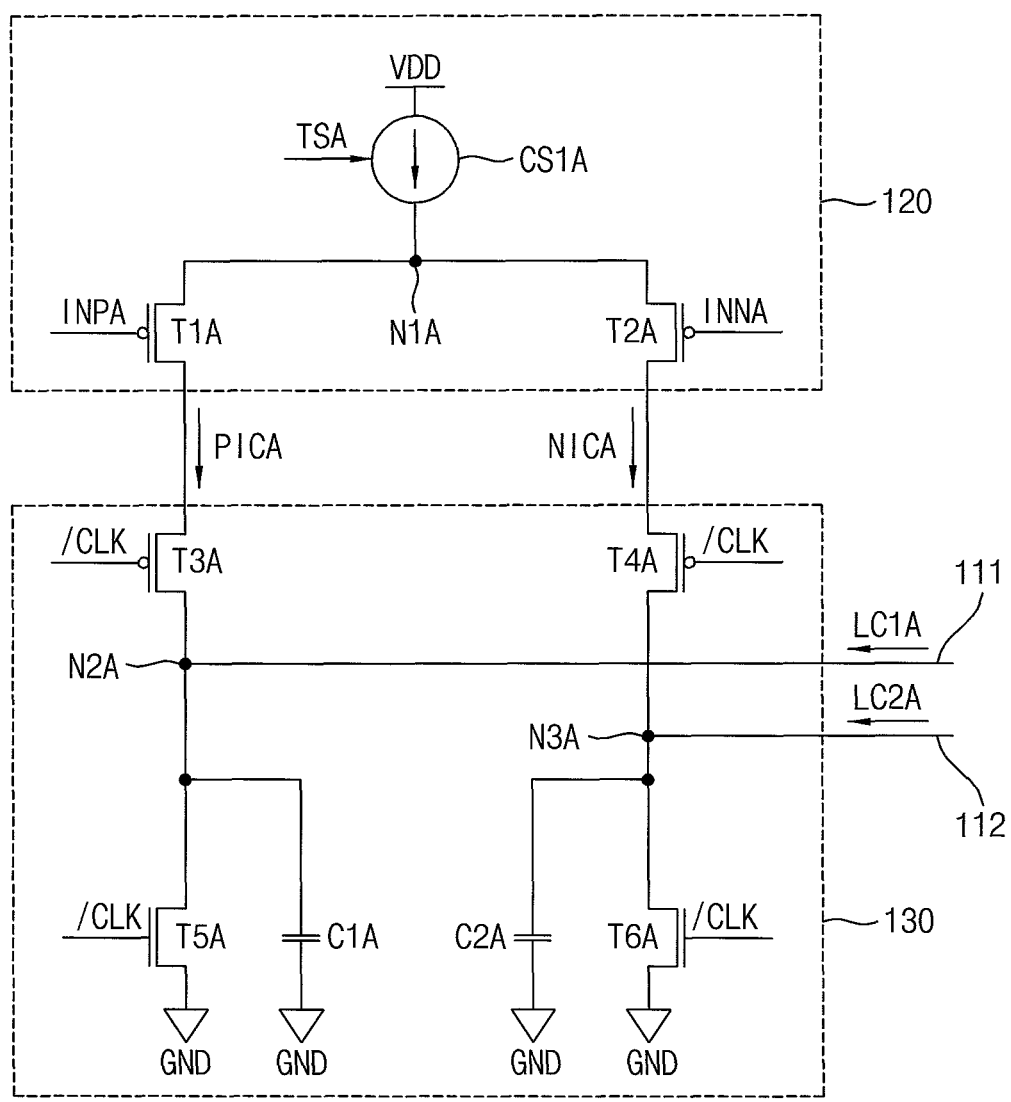
FIG. 2 is a block diagram illustrating a first circuit included in the decision feedback equalizer of FIG. 1.

FIG. 2 is a block diagram illustrating the first circuit included in the decision feedback equalizer of FIG. 1.

Referring to FIG. 2, the first circuit 180 includes the differential driver 120 and the load unit 130.

The differential driver 120 may include a current source CS1A, a first transistor T1A, and a second transistor T2A. The first and second transistors T1A and T2A may be PMOS transistors, respectively. A terminal of the current source CS1A may receive supply voltage VDD, another terminal of the current source CS1A may be connected to a first node N1A, and strength of the current source CS1A may correspond to the temperature signal TSA. A source terminal of the first transistor T1A may be connected to the first node N1A, a gate terminal of the first transistor T1A may receive the positive input signal INPA, and a drain terminal of the first transistor T1A may output the positive input current PICA. A source terminal of the second transistor T2A may be connected to the first node N1A, a gate terminal of the second transistor T2A may receive the negative input signal INNA, and a drain terminal of the second transistor T2A may output the negative input current NICA.

In an example embodiment, the strength of the current source CS1A may be in proportion to the temperature signal TSA. In an example embodiment, strength of the positive input current PICA and strength of the negative input current NICA may be in proportion to the temperature signal TSA.

The load unit 130 may include third through sixth transistors T3A, T4A, T5A, and T6A. The third and fourth transistors T3A and T4A may be PMOS transistors, respectively. The fifth and sixth transistors T5A and T6A may be NMOS transistors, respectively.

A source terminal of the third transistor T3A may receive the positive input current PICA, a gate terminal of the third transistor T3A may receive an inverted clock signal /CLK, which is an inverted signal of the clock signal CLK, and a drain terminal of the third transistor T3A may be connected to a second node N2A, and the first current LC1A may be inputted to the second node N2A through the positive signal line 111. A source terminal of the fourth transistor T4A may receive the negative input current NICA, a gate terminal of the fourth transistor T4A may receive the inverted clock signal /CLK, and a drain terminal of the fourth transistor T4A may be connected to a third node N3A, and the second current LC2A may be inputted to the third node N3A through the negative signal line 112. A drain terminal of the fifth transistor T5A may be connected to the second node N2A, a gate terminal of the fifth transistor T5A may receive the inverted clock signal /CLK, and a source terminal of the fifth transistor T5A may receive a ground voltage GND. A terminal of a first capacitor C1A may be connected to the second node N2A and another terminal of the first capacitor C1A may receive the ground voltage GND. A drain terminal of the sixth transistor T6A may be connected to the third node N3A, a gate terminal of the sixth transistor T6A may receive the inverted clock signal /CLK, and a source terminal of the sixth transistor T6A may receive the ground voltage GND. A terminal of a second capacitor C2A may be connected to the third node N3A and another terminal of the second capacitor C2A may receive the ground voltage GND.

In the pre-charge period when the clock signal CLK is deactivated, the third and fourth transistors T3A and T4A are turned off, the fifth and sixth transistors T5A and T6A are turned on, the ground voltage GND is applied to two terminals of the first capacitor C1A and two terminals of the second capacitor C2A, and the first capacitor C1A and the second capacitor C2A are discharged.

In the normal period when the clock signal CLK is activated, the third and fourth transistors T3A and T4A are turned on, the fifth and sixth transistors T5A and T6A are turned off, the first capacitor C1A is charged with the first current LC1A and the positive input current PICA flowing through the third transistor T3A, and the second capacitor C2A is charged with the second current LC2A and the negative input current NICA flowing through the fourth transistor T4A.

Figure 3:
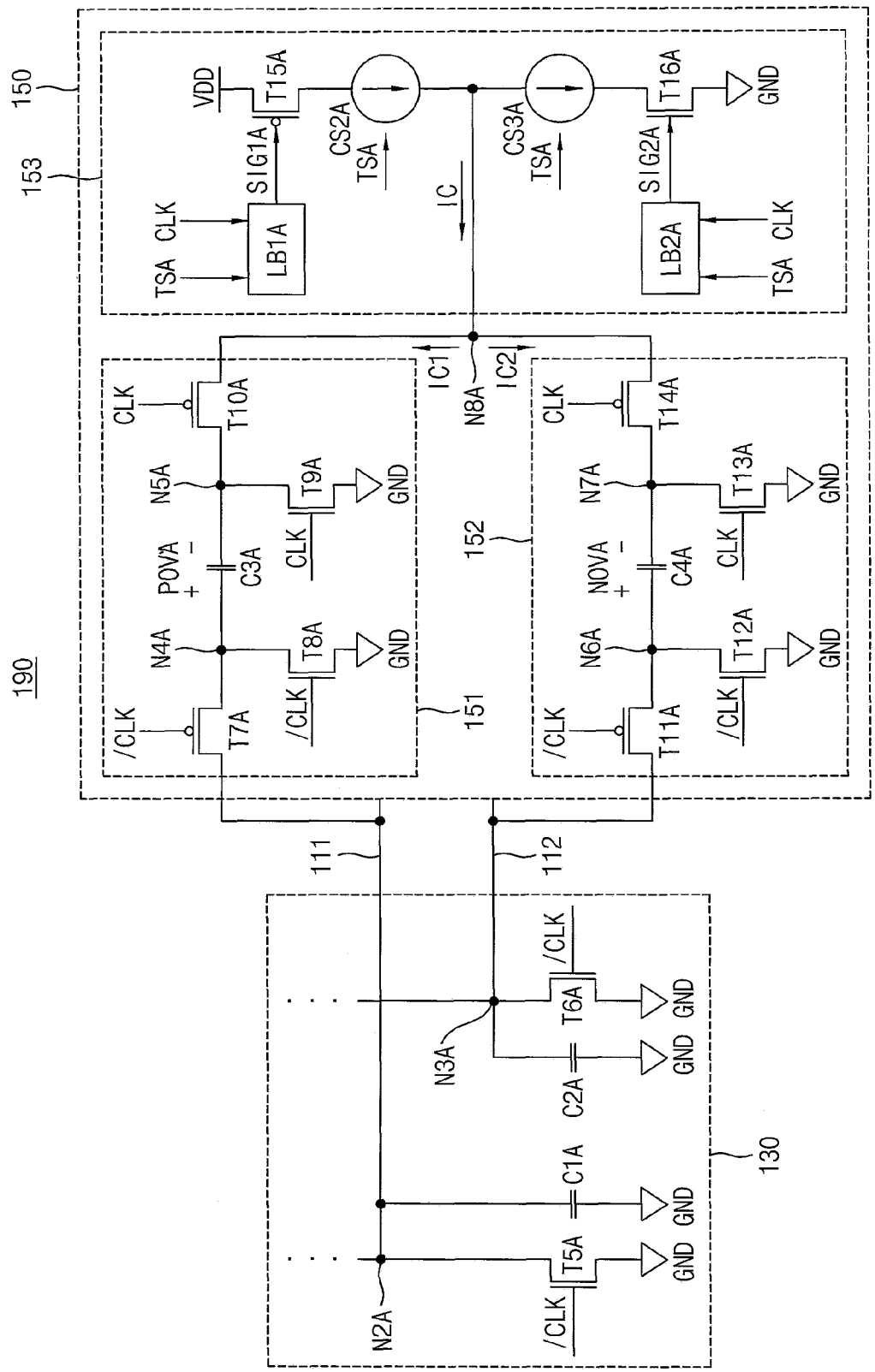
FIG. 3 is a block diagram illustrating a second circuit included in the decision feedback equalizer of FIG. 1.

FIG. 3 is a block diagram illustrating the second circuit included in the decision feedback equalizer of FIG. 1.

Referring to FIG. 3, the second circuit 190 includes the load unit 130 and the charge pump 150. The load unit 130 may be understood based on the descriptions provided above with reference to FIG. 2. The charge pump 150 may include a current generator 153, a positive sub charge pump 151, and a negative sub charge pump 152.

The positive sub charge pump 151 may include a third capacitor C3A and seventh through tenth transistors T7A, T8A, T9A, and T10A. The negative sub charge pump 152 may include a fourth capacitor C4A and eleventh through fourteenth transistors T11A, T12A, T13A, and T14A.

The current generator 153 may generate an internal current IC corresponding to the temperature signal TSA. The internal current IC may be divided into a positive internal current IC1 and a negative internal current IC2.

The current generator 153 may include a first execution block LB1A, a second execution block LB2A, a fifteenth transistor T15A, a sixteenth transistor T16A, a first current source CS2A, and a second current source CS3A. The first execution block LB1A may deactivate a first signal SIG1A when a value of the temperature signal TSA is greater than or equal to a reference value or the clock signal CLK is activated. The first execution block LB1A may activate the first signal SIG1A when the value of the temperature signal TSA is smaller than the reference value and the clock signal CLK is deactivated. A source terminal of the fifteenth transistor T15A may receive supply voltage VDD, a gate terminal of the fifteenth transistor T15A may receive the first signal SIG1A, a drain terminal of the fifteenth transistor T15A may be connected to a terminal of the first current source CS2A, another terminal of the first current source CS2A may be connected to a first node N8A, and the internal current IC may be outputted from the first node N8A. A terminal of the second current source CS3A may be connected to the first node N8A and another terminal of the second current source CS3A may be connected to a drain terminal of the sixteenth transistor T16A. The second execution block LB2A may activate a second signal SIG2A when the value of the temperature signal TSA is smaller than the reference value or the clock signal CLK is activated. The second execution block LB2A may deactivate the second signal SIG2A when the value of the temperature signal TSA is greater than or equal to the reference value and the clock signal CLK is deactivated. A gate terminal of the sixteenth transistor T16A may receive the second signal SIG2A and a source terminal of the sixteenth transistor T16A may receive the ground voltage GND. In an example embodiment, difference between strength of the first current source CS2A and strength of the second current source CS3A may be in proportion to a difference between the temperature signal TSA and the reference value.

The seventh, tenth, eleventh, fourteenth, and fifteenth transistors T7A, T10A, T11A, T14A, and T15A may be PMOS transistors, respectively. The eighth, ninth, twelfth, thirteenth, and sixteenth transistors T8A, T9A, T12A, T13A, and T16A may be NMOS transistors, respectively.

The positive sub charge pump 151 may charge the third capacitor C3A with the positive internal current IC1 during the pre-charge period such that a voltage between two terminals of the third capacitor C3A becomes the positive offset voltage POVA. The positive sub charge pump 151 may provide the positive offset voltage POVA, which is charged between the two terminals of the third capacitor C3A, to the positive signal line 111 during the normal period.

In detail, a drain terminal of the seventh transistor T7A may be connected to the positive signal line 111, a gate terminal of the seventh transistor T7A may receive an inverted clock signal /CLK, which is an inverted signal of the clock signal CLK, and a source terminal of the seventh transistor T7A may be connected to a fourth node N4A. A drain terminal of the eighth transistor T8A may be connected to the fourth node N4A, a gate terminal of the eighth transistor T8A may receive the inverted clock signal /CLK, and a source terminal of the eighth transistor T8A may receive the ground voltage GND. A terminal of the third capacitor C3A may be connected to the fourth node N4A and another terminal of the third capacitor C3A may be connected to a fifth node N5A. A drain terminal of the ninth transistor T9A may be connected to the fifth node N5A, a gate terminal of the ninth transistor T9A may receive the clock signal CLK, and a source terminal of the ninth transistor T9A may receive the ground voltage GND. A drain terminal of the tenth transistor T10A may be connected to the fifth node N5A, a gate terminal of the tenth transistor T10A may receive the clock signal CLK, and a source terminal of the tenth transistor T10A may receive the positive internal current IC1.

The negative sub charge pump 152 may charge the fourth capacitor C4A with the negative internal current IC2 during the pre-charge period such that a voltage between two terminals of the fourth capacitor C4A becomes the negative offset voltage NOVA. The negative sub charge pump 152 may provide the negative offset voltage NOVA, which is charged between the two terminals of the fourth capacitor C4A, to the negative signal line 112 during the normal period. In an example embodiment, the positive offset voltage POVA may be the same as the negative offset voltage NOVA.

A drain terminal of the eleventh transistor T11A may be connected to the negative signal line 112, a gate terminal of the eleventh transistor T11A may receive the inverted clock signal /CLK and a source terminal of the eleventh transistor T11A may be connected to a sixth node N6A. A drain terminal of the twelfth transistor T12A may be connected to the sixth node N6A, a gate terminal of the twelfth transistor T12A may receive the inverted clock signal /CLK, and a source terminal of the twelfth transistor T12A may receive the ground voltage GND. A terminal of the fourth capacitor C4A may be connected to the sixth node N6A and another terminal of the fourth capacitor C4A may be connected to a seventh node N7A. A drain terminal of the thirteenth transistor T13A may be connected to the seventh node N7A, a gate terminal of the thirteenth transistor T13A may receive the clock signal CLK, and a source terminal of the thirteenth transistor T13A may receive the ground voltage GND. A drain terminal of the fourteenth transistor T14A may be connected to the seventh node N7A, a gate terminal of the fourteenth transistor T14A may receive the clock signal CLK, and a source terminal of the fourteenth transistor T14A may receive the negative internal current IC2.

In the pre-charge period when the clock signal CLK is deactivated, if the value of the temperature signal TSA is equal to or greater than the reference value, the first signal SIG1A is deactivated and the second signal SIG2A is deactivated. The seventh, ninth, eleventh, thirteenth, and sixteenth transistors T7A, T9A, T11A, T13A, and T16A are turned off, and the eighth, tenth, twelfth, fourteenth, and fifteenth transistors T8A, T10A, T12A, T14A, and T15A are turned on. The positive internal current IC1, generated from the first current source CS2A, charges the third capacitor C3A such that a voltage between two terminals of the third capacitor C3A becomes the positive offset voltage POVA. The negative internal current IC2, generated from the first current source CS2A, charges the fourth capacitor C4A such that a voltage between two terminals of the fourth capacitor C4A becomes the negative offset voltage NOVA.

In the normal period when the clock signal CLK is activated, if the value of the temperature signal TSA is equal to or greater than the reference value, the first signal SIG1A is deactivated and the second signal SIG2A is activated. The seventh, ninth, eleventh, thirteenth, fifteenth, and sixteenth transistors T7A, T9A, T11A, T13A, T15A, and T16A are turned on, and the eighth, tenth, twelfth, and fourteenth transistors T8A, T10A, T12A, and T14A are turned off. Because the fifteenth and sixteenth transistors T15A and T16A are turned on, a voltage of the eighth node N8A is maintained at a certain voltage in the normal period. In the normal period, a polarity of the positive offset voltage POVA, which is voltage between two terminals of the third capacitor C3A, is inverted and the inverted positive offset voltage POVA is applied to the positive signal line 111. In the normal period, a polarity of the negative offset voltage NOVA, which is voltage between two terminals of the fourth capacitor C4A, is inverted and the inverted negative offset voltage NOVA is applied to the negative signal line 112.

In the pre-charge period when the clock signal CLK is deactivated, if the value of the temperature signal TSA is smaller than the reference value, the first signal SIG1A is activated and the second signal SIG2A is activated. The seventh, ninth, eleventh, thirteenth, and fifteenth transistors T7A, T9A, T11A, T13A, and T15A are turned off, and the eighth, tenth, twelfth, fourteenth, and sixteenth transistors T8A, T10A, T12A, T14A, and T16A are turned on. The positive internal current IC1, generated from the second current source CS3A, charges the third capacitor C3A such that a voltage between two terminals of the third capacitor C3A becomes the positive offset voltage POVA. The negative internal current IC2, generated from the second current source CS3A, charges the fourth capacitor C4A such that a voltage between two terminals of the fourth capacitor C4A becomes the negative offset voltage NOVA. In this case, the positive offset voltage POVA and the negative offset voltage NOVA may have a negative value, respectively.

In the normal period when the clock signal CLK is activated, if the value of the temperature signal TSA is smaller than the reference value, the first signal SIG1A is deactivated and the second signal SIG2A is activated. The seventh, ninth, eleventh, thirteenth, fifteenth, and sixteenth transistors T7A, T9A, T11A, T13A, T15A, and T16A are turned on, and the eighth, tenth, twelfth, and fourteenth transistors T8A, T10A, T12A, and T14A are turned off. Because the fifteenth and sixteenth transistors T15A and T16A are turned on, a voltage of the eighth node N8A is maintained at a certain voltage in the normal period. In the normal period, the polarity of the positive offset voltage POVA, which is voltage between two terminals of the third capacitor C3A, is inverted and the inverted positive offset voltage POVA is applied to the positive signal line 111. In the normal period, the polarity of the negative offset voltage NOVA, which is voltage between two terminals of the fourth capacitor C4A, is inverted and the inverted negative offset voltage NOVA is applied to the negative signal line 112.

Figure 4:
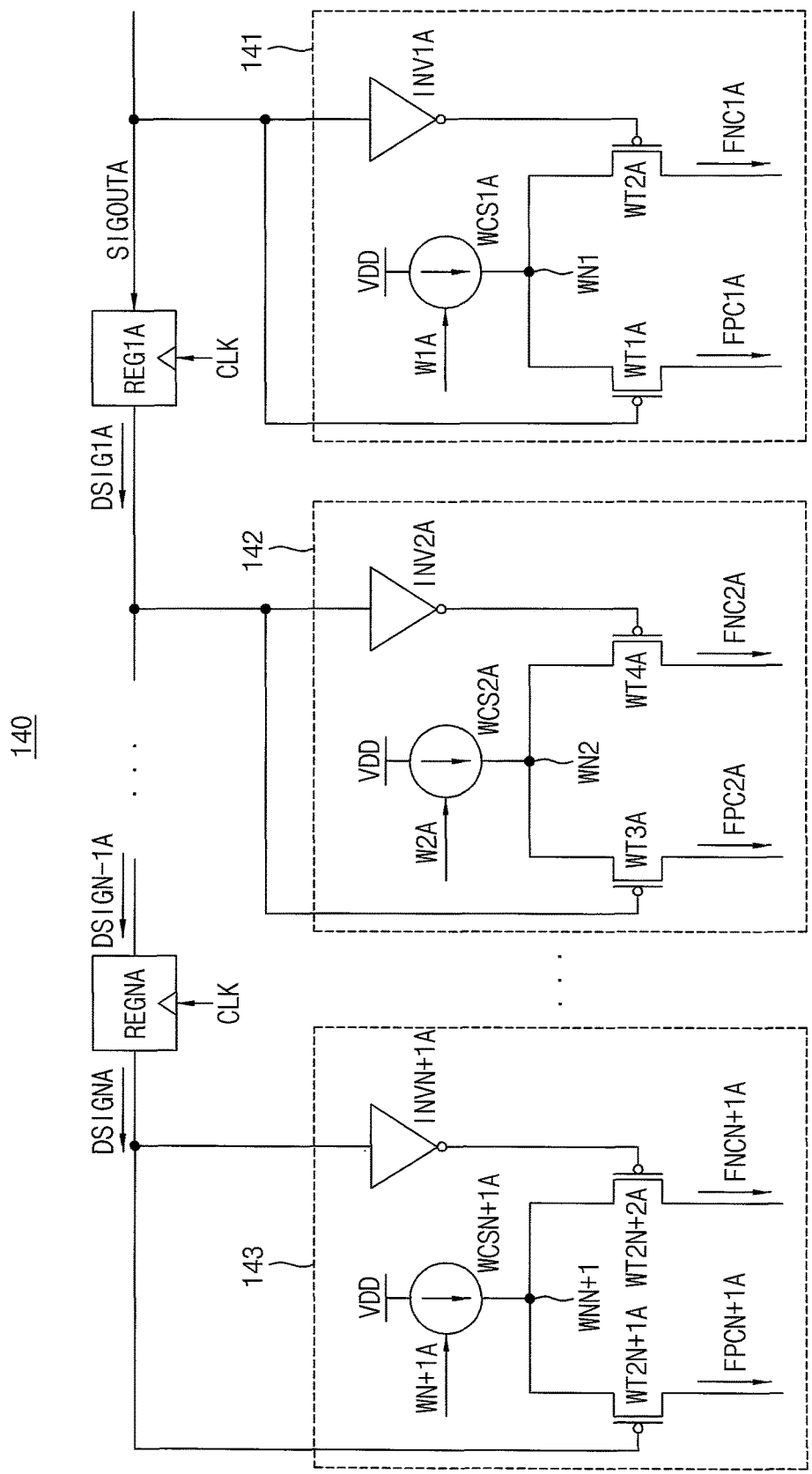
FIG. 4 is a block diagram illustrating a feedback driver included in the decision feedback equalizer of FIG. 1.

FIG. 4 is a block diagram illustrating the feedback driver included in the decision feedback equalizer of FIG. 1.

Referring to FIG. 4, the feedback driver 140 may include first through (N)-th registers REG1A through REGNA (N is a natural number) and first through (N+1)-th drivers 141, 142 through 143. The positive feedback current FPCA may include first through (N+1)-th positive sub feedback currents FPCA1A through FPCN+1A. The negative feedback current FNCA may include first through (N+1)-th negative sub feedback currents FNC1A through FNCN+1A.

The first register REG1A may store a first signal DSIG1A, which is sampled from the output signal SIGOUTA at the falling edge of the clock signal CLK. The (K+1)-th register (K is a natural number smaller than N) may store a (K+1)-th signal, which is sampled from a (K)-th signal at the falling edge of the clock signal CLK. The (N)-th register REGNA may store the (N)-th signal DSIGNA, which is sampled from the (N−1)-th signal DSIGN−1A at the falling edge of the clock signal CLK.

The first driver 141 may generate the first positive sub feedback current FPC1A and the first negative sub feedback current FNC1A by driving the output signal SIGOUTA in response to a first weight signal W1A. The second driver 142 may generate the second positive sub feedback current FPC2A and the second negative sub feedback current FNC2A by driving the first signal DSIG1A in response to a second weight signal W2A. The (N+1)-th driver 143 may generate the (N+1)-th positive sub feedback current FPCN+1A and the (N+1)-th negative sub feedback current FNCN+1A by driving the (N)-th signal DSIGNA in response to a (N+1)-th weight signal WN+1A.

Characteristic of the decision feedback equalizer 100 may be determined based on the first through (N+1)-th weight signals W1A, W2A through WN+1A.

Figure 5:
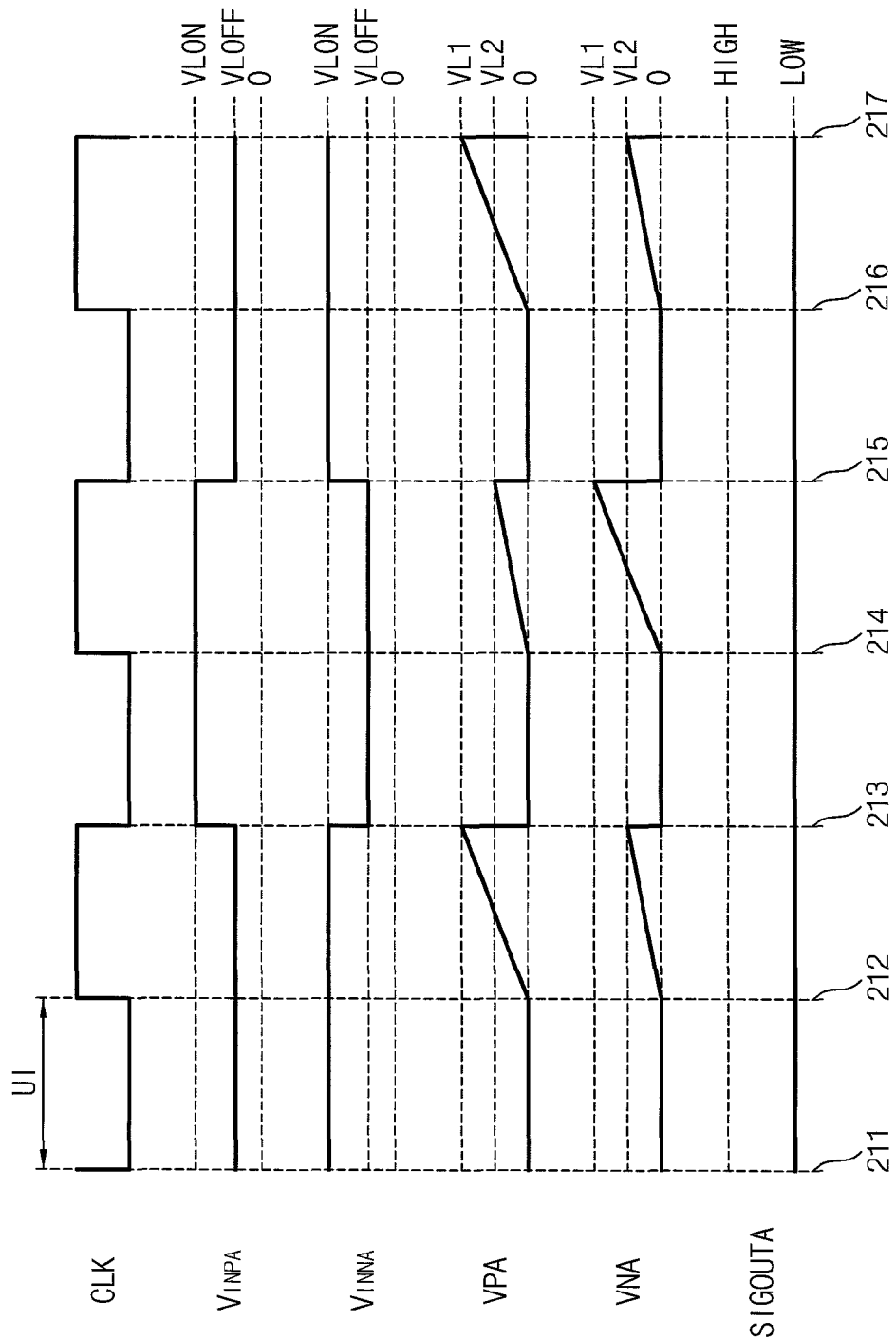
FIGS. 5 and 6 are timing diagrams illustrating an operation of the decision feedback equalizer of FIG. 1.
Figure 6:
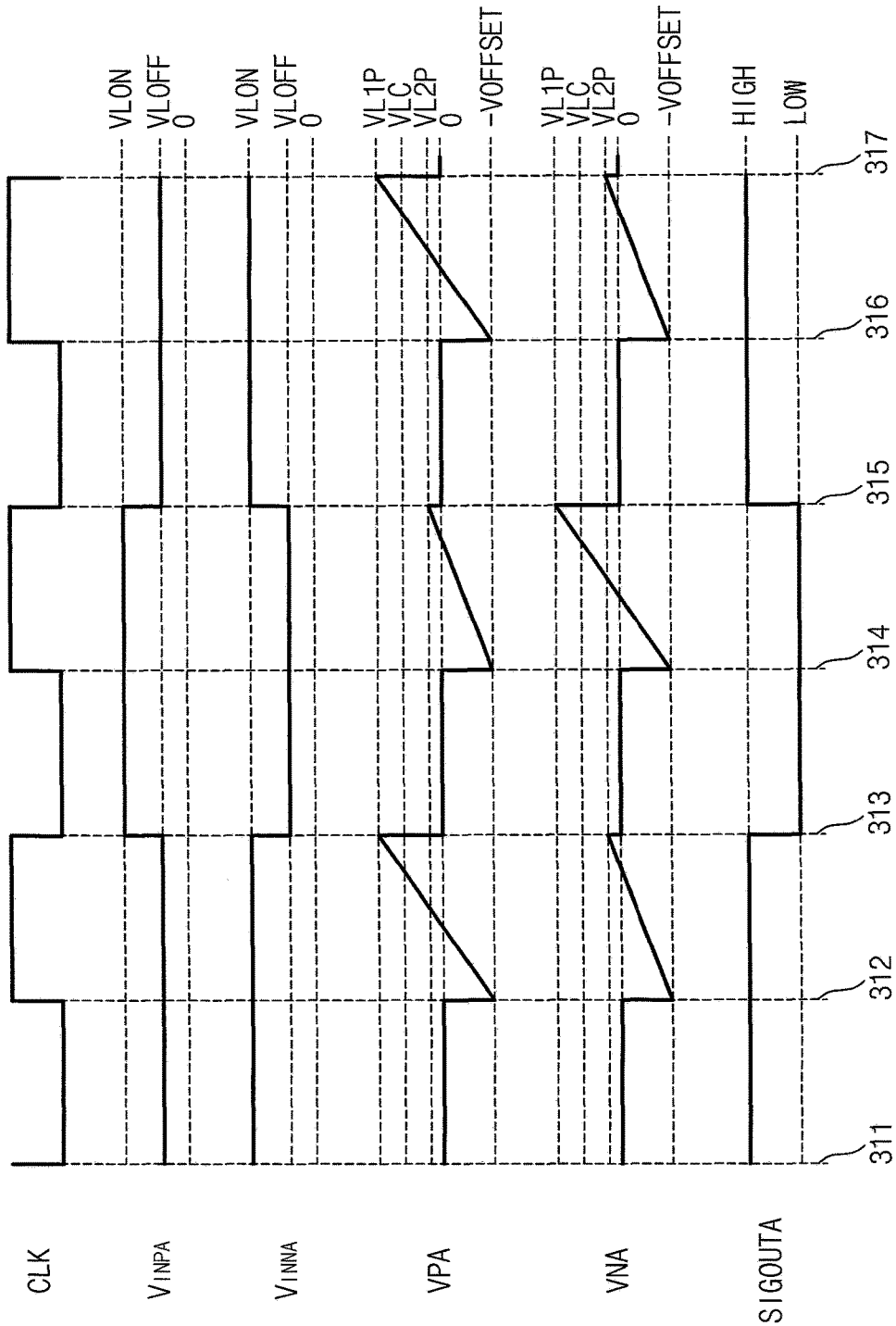

FIGS. 5 and 6 are timing diagrams illustrating an operation of the decision feedback equalizer of FIG. 1.

Referring to FIG. 5, the first pre-charge period 211~212 is from the first time point 211 to the second time point 212. The first normal period 212~213 is from the second time point 212 to the third time point 213. The second pre-charge period 213~214 is from the third time point 213 to the fourth time point 214. The second normal period 214~215 is from the fourth time point 214 to the fifth time point 215. The third pre-charge period 215~216 is from the fifth time point 215 to the sixth time point 216. The third normal period 216~217 is from the sixth time point 216 to the seventh time point 217.

The decision feedback equalizer 100 has a common mode gain and a differential mode gain.

The common mode gain is defined as an average between a first voltage VPA of the positive signal line 111 and a second voltage VNA of the negative signal line 112 at last time points 213, 215, and 217 of the normal periods 212~213, 214~215, and 216~217 over an average of a voltage difference between a voltage $V_{INPA}$ of the positive input signal INPA and a voltage $V_{INNA}$ of the negative signal INNA according to [Equation 1]. In FIG. 5, the common mode gain is $(VL1+VL2)/\{2*(VLON-VLOFF)\}$ by using Equation 1.

$$\text{Common mode gain} = \frac{\text{Peak of } ((VPA + VNA)/2)}{\text{Average of } (V_{INPA} - V_{INNA})} \quad \text{[Equation 1]}$$

The differential mode gain may be defined as [Equation 2].

$$\text{Differential mode gain} = gm \times UI/C \quad \text{[Equation 2]}$$

In [Equation 2], gm denotes transistor transconductance and may be calculated according to [Equation 3]. UI denotes a length of duration in which the clock signal CLK is deactivated in a period of the clock signal CLK or a length of duration in which the clock signal CLK is activated in a period of the clock signal CLK. C denotes an effective output capacitance.

$$gm = \mu C_{OX} W/L (V_{gs} - V_{th}) \quad \text{[Equation 3]}$$

As the temperature increases, the mobility μ and the threshold voltage Vth decreases and the transistor transconductance gm also decreases. As the transistor transconductance gm decreases, the differential mode gain decreases and voltage difference of the first voltage VPA and the second voltage VNA at the last time points 213, 215, and 217 of the normal periods 212~213, 214~215, and 216~217 decreases.

FIG. 5 shows a case in which the sense amplifier 160 does not correctly generate the output signal SIGOUTA because temperature increases such that the differential mode gain decreases, and a voltage difference |VL1-VL2| of the first voltage VPA and the second voltage VNA at the last time points 213, 215, and 217 of the normal periods 212~213, 214~215, and 216~217 is smaller than the reference voltage VREFA.

In FIG. 6, when the temperature increases, the positive offset voltage POVA having a value of $-V_{OFFSET}$ corresponding to an increased value of the temperature signal TSA is applied to the positive signal line 111 and the negative offset voltage NOVA having a value of $-V_{OFFSET}$ is applied to the negative signal line 112 at last time points 313, 315, and 317 of normal periods 312~313, 314~315, and 316~317. The differential driver 120 may increase strength of the positive input current PICA and the negative input current NICA corresponding to the increased value of the temperature signal TSA in the normal periods 312~313, 314~315, and 316~317.

In FIG. 6, the common mode gain is (VL1P+VL2P)/{2*(VLON-VLOFF)}. If (VL1P+VL2P) is equal to (VL1+VL2), the common mode gain of FIG. 6 is maintained to be the same as the common mode gain of FIG. 5. FIG. 6 shows a case in which the sense amplifier 160 correctly generates the output signal SIGOUTA even when temperature increases and gm decreases because a voltage difference |VL1P-VL2P| of the first voltage VPA and the second voltage VNA at the last time points 313, 315, and 317 of the normal periods 312~313, 314~315, and 316~317 is maintained to be larger than the reference voltage VREFA. In FIG. 6, VLC denotes an average of VL1P and VL2P.

An operation of the decision feedback equalizer 100 in a case in which temperature decreases may be understood based on the description provided above with references to FIGS. 5 and 6 and thus a description thereof will be omitted.

Figure 7:
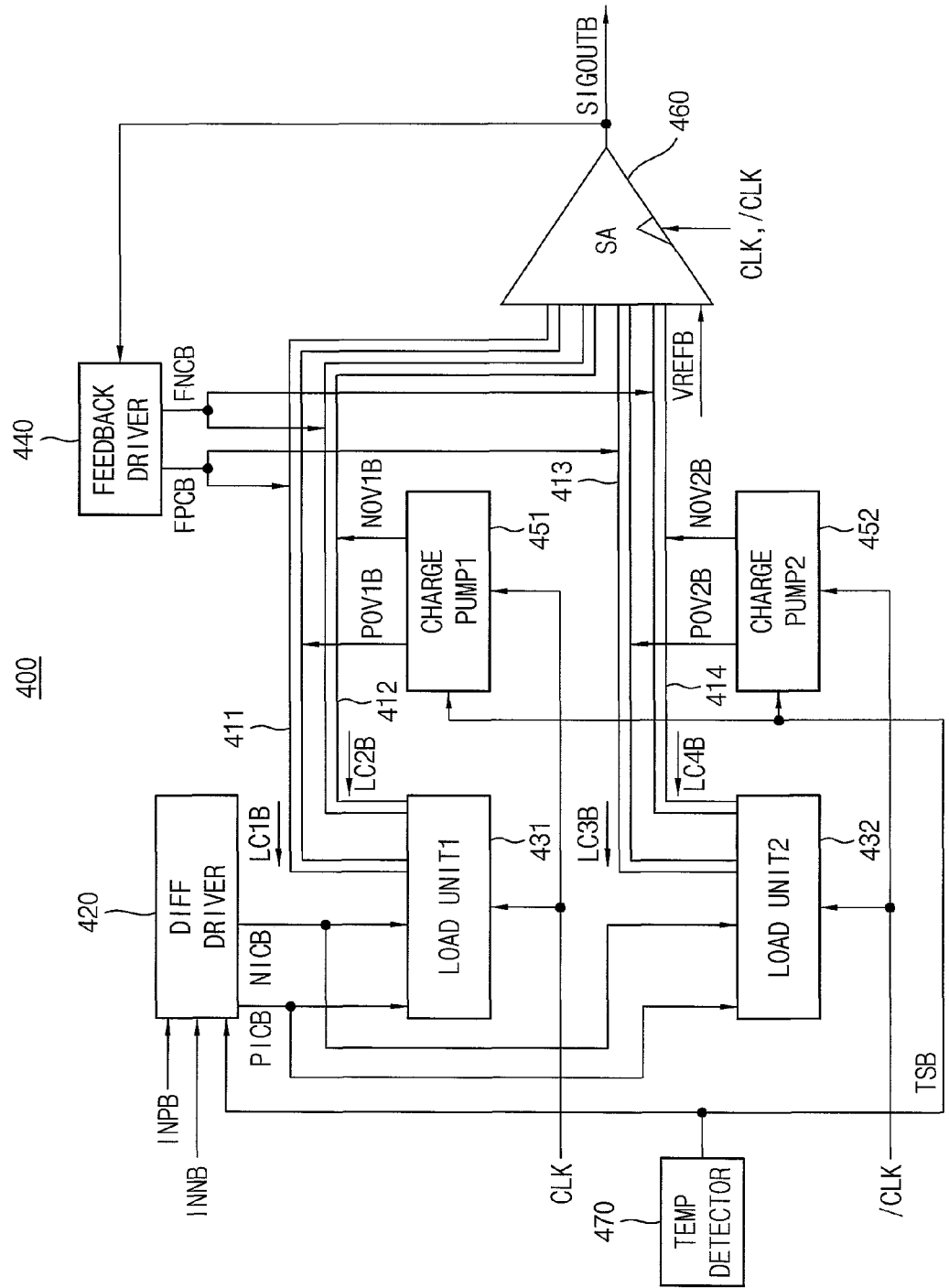
FIG. 7 is a block diagram illustrating a decision feedback equalizer according to another example embodiment.

FIG. 7 is a block diagram illustrating a decision feedback equalizer according to another example embodiment.

Referring to FIG. 7, a decision feedback equalizer 400 includes first and second positive signal lines 411 and 413, first and second negative signal lines 412 and 414, a sense amplifier 460, a feedback driver 440, a first load unit 431, a second load unit 432, a differential driver 420, a first charge pump 451, and a second charge pump 452.

The sense amplifier 460 generates an output signal SIGOUTB by comparing a reference voltage VREFB and a voltage difference between a first voltage of the first positive signal line 411 and a second voltage of the first negative signal line 412 at a falling edge of a clock signal CLK. The sense amplifier 460 generates the output signal SIGOUTB by comparing the reference voltage VREFB and a voltage difference between a third voltage of the second positive signal line 413 and a fourth voltage of the second negative signal line 414 at a rising edge of the clock signal CLK.

The feedback driver 440 generates a positive feedback current FPCB based on the output signal SIGOUTB and provides the positive feedback current FPCB to the first and second positive signal lines 411 and 413. The feedback driver 440 generates a negative feedback current FNCB based on the output signal SIGOUTB and provides the negative feedback current FNCB to the first and second negative signal lines 412 and 414.

The first load unit 431 includes a first capacitor and a second capacitor. The first voltage is a voltage between two terminals of the first capacitor. The second voltage is a voltage between two terminals of the second capacitor. The first load unit 431 discharges the first and second capacitors during a pre-charge period. The clock signal CLK is deactivated during the pre-charge period. The first load unit 431 charges the first capacitor with a positive input current PICB from the differential driver 420 and a first current LC1B from the first positive signal line 411 during a normal period. The clock signal CLK is activated during the normal period. The first load unit 431 charges the second capacitor with a negative input current NICB from the differential driver 420 and a second current LC2B from the first negative signal line 412 during the normal period. The second load unit 432 includes a third capacitor and a fourth capacitor. The third voltage is a voltage between two terminals of the third capacitor. The fourth voltage is a voltage between two terminals of the fourth capacitor. The second load unit 432 discharges the third and fourth capacitors during the normal period. The second load unit 432 charges the third capacitor with the positive input current PICB from the differential driver 420 and a third current LC3B from the second positive signal line 413 during the pre-charge period. The second load unit 432 charges the fourth capacitor with the negative input current NICB from the differential driver 420 and a fourth current LC4B from the second negative signal line 414 during the pre-charge period. Other aspects of the first and second load units 431 and 432 may be understood based on the descriptions provided above with reference to FIG. 2 and thus further descriptions thereof will be omitted.

The differential driver 420 maintains a difference between the first voltage and the second voltage at a last time point of the normal period to be equal to or greater than the reference voltage VREFB and maintains a difference between the third voltage and the fourth voltage at a last time point of the pre-charge period to be equal to or greater than the reference voltage VREFB, by adjusting strength of the positive input current PICB corresponding to a positive input signal INPB and strength of the negative input current NICB corresponding to a negative input signal INNB based on a temperature signal TSB.

In an example embodiment, the decision feedback equalizer 400 may further include a temperature detector 470 which generates the temperature signal TSB based on detected temperature. For example, the temperature detector 470 may generate the temperature signal TSB to have an increased value according to an increase of the detected temperature.

The first charge pump 451 provides a first positive offset voltage POV1B and a first negative offset voltage NOV1B to the first positive signal line 411 and the first negative signal line 412, respectively. The first positive offset voltage POV1B and the first negative offset voltage NOV1B maintain an average voltage of the first voltage and the second voltage at the last time point of the normal period at a first value independent of the temperature signal TSB. The second charge pump 452 provides a second positive offset voltage POV2B and a second negative offset voltage NOV2B to the second positive signal line 413 and the second negative signal line 414, respectively. The second positive offset voltage POV2B and the second negative offset voltage NOV2B maintain an average voltage of the third voltage and the fourth voltage at the last time point of the pre-charge period at the first value independent of the temperature signal TSB. Other aspects of the first and second charge pumps 451, 452 may be understood based on the descriptions provided above with reference to FIG. 3 and thus further descriptions thereof will be omitted.

Figure 8:
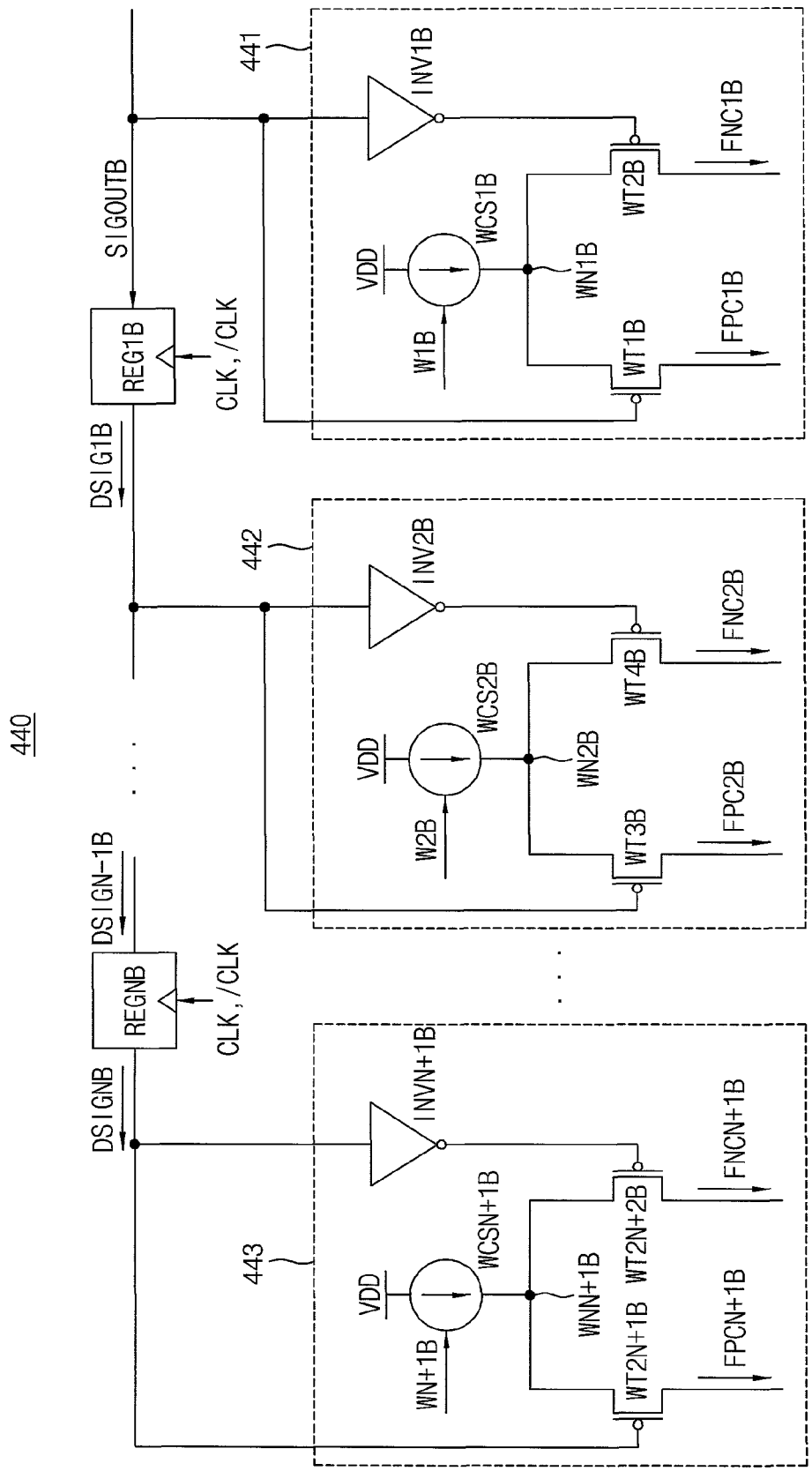
FIG. 8 is a block diagram illustrating a feedback driver included in the decision feedback equalizer o FIG. 7.

FIG. 8 is a block diagram illustrating the feedback driver included in the decision feedback equalizer o FIG. 7.

The feedback driver 440 of FIG. 8 has the same or similar structure with the feedback driver 140 of FIG. 4 except that the first through (N)-th registers REG1B through REGNB operate in response to a falling edge of the clock signal CLK and a falling edge of the inverted clock signal /CLK. Other aspects of the feedback driver 440 may be understood based on the descriptions provided above with reference to FIG. 4.

Figure 9:
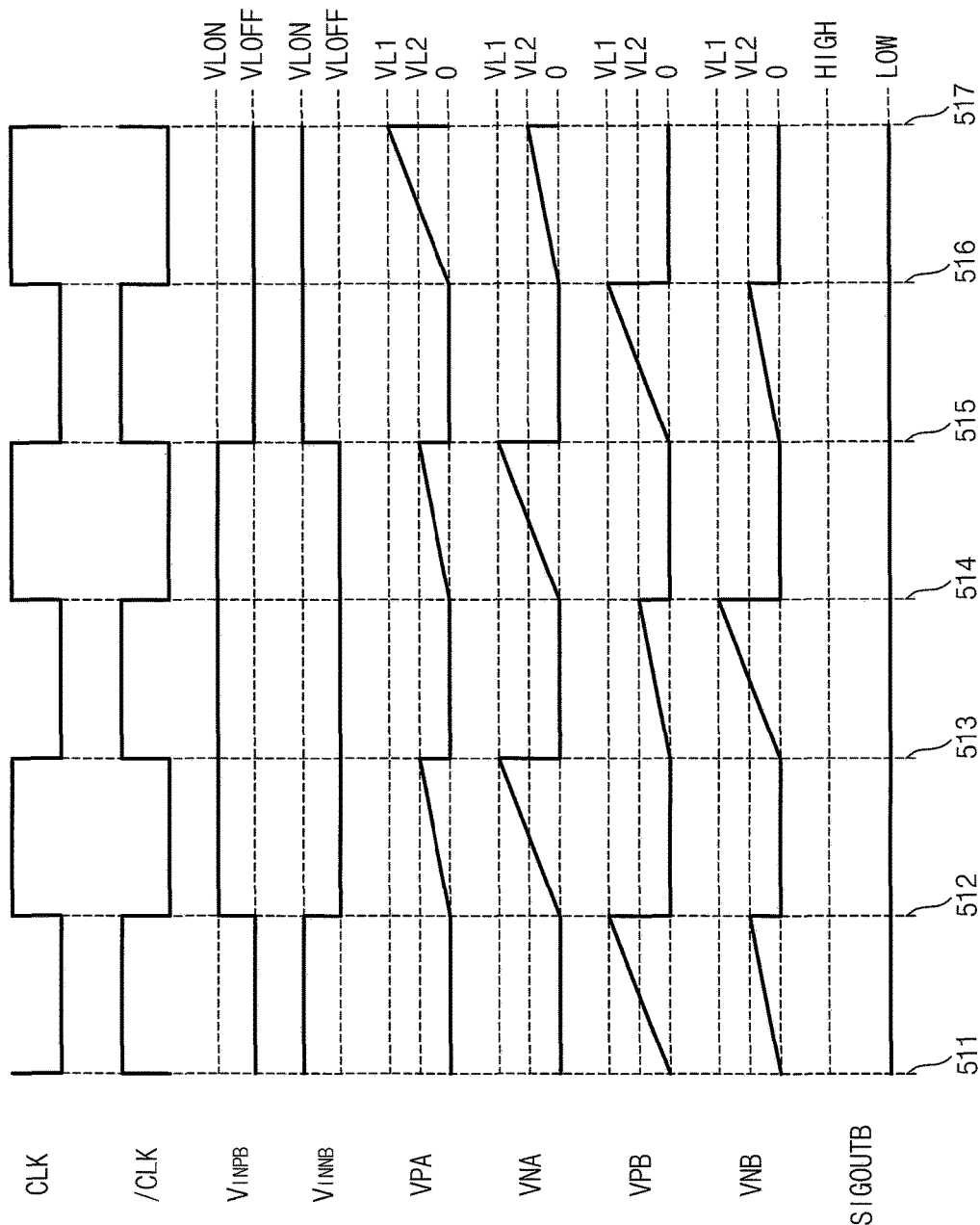
FIGS. 9 and 10 are timing diagrams illustrating an operation of the decision feedback equalizer of FIG. 7.
Figure 10:
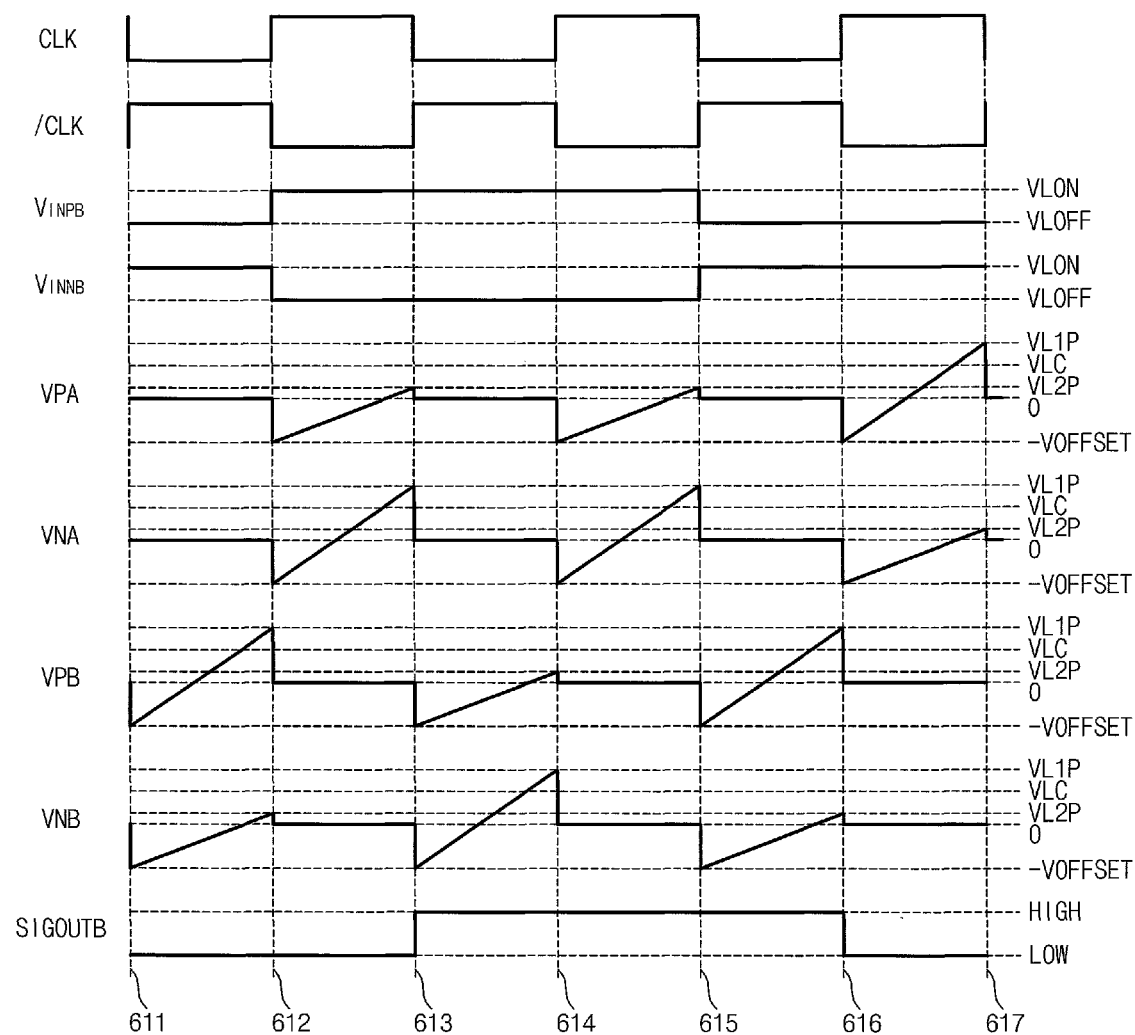

FIGS. 9 and 10 are timing diagrams illustrating an operation of the decision feedback equalizer of FIG. 7.

FIG. 9 shows a case in which the sense amplifier 460 does not correctly generate the output signal SIGOUTAB when temperature increases similar to the case described above in FIG. 5. FIG. 10 shows a case in which the sense amplifier 460 correctly generates the output signal SIGOUTB even when temperature increases by controlling the positive offset voltages POV1B, POV2B, the negative offset voltages NOV1B, NOV2B, the positive input current PICB, and the negative input current NICB. In FIG. 10, VLC denotes an average of VL1P and VL2P Operations of the decision feedback equalizer 400 may be understood based on the descriptions provided above with references to FIGS. 5 and 6 and thus further descriptions thereof may be omitted.

Figure 11:
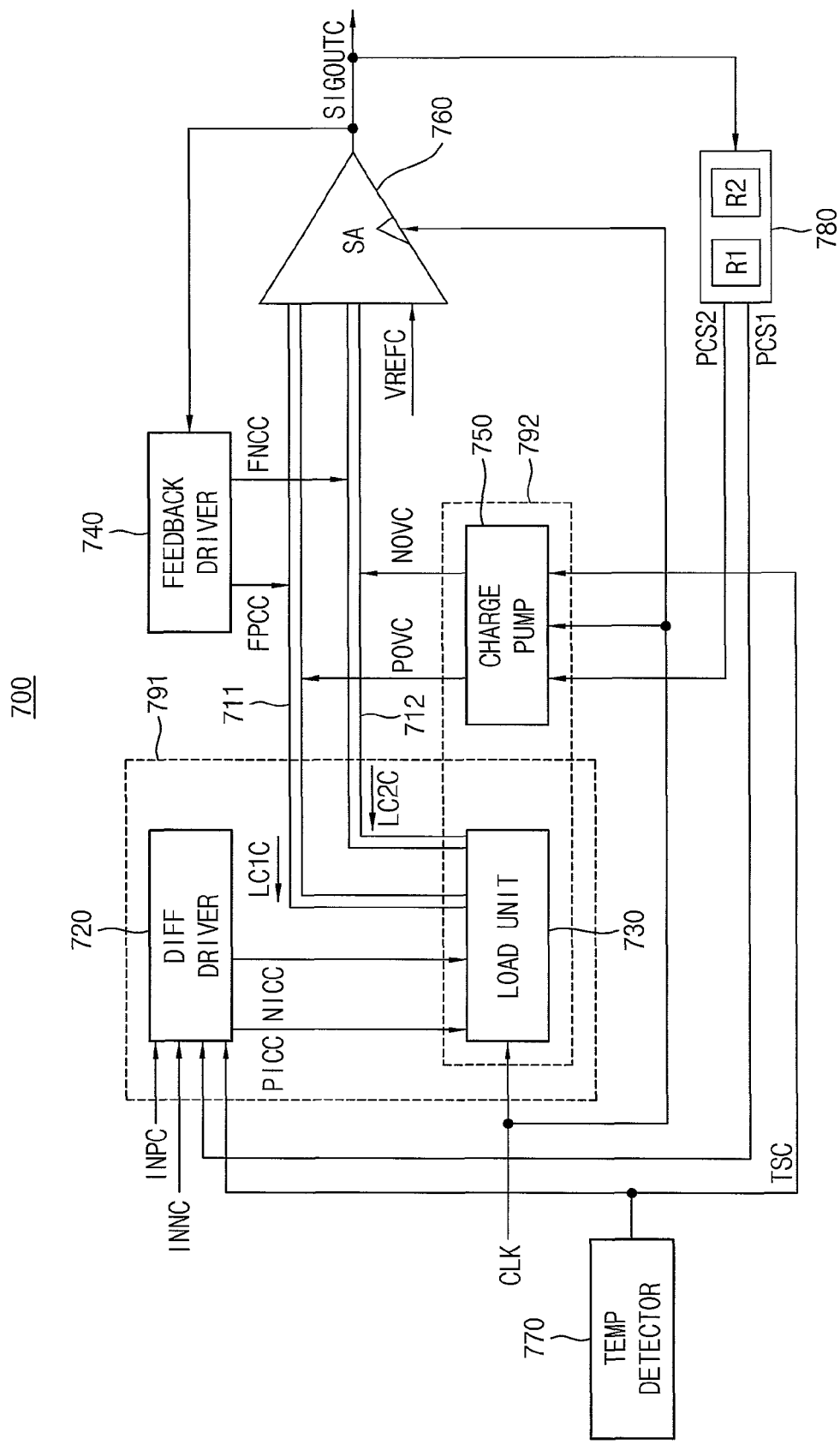
FIG. 11 is a block diagram illustrating a decision feedback equalizer according to still another example embodiment.

FIG. 11 is a block diagram illustrating a decision feedback equalizer according to still another example embodiment.

Referring to FIG. 11, a decision feedback equalizer 700 includes a positive signal line 711 and a negative signal line 712, a sense amplifier 760, a feedback driver 740, a load unit 730, a process compensator 780, a differential driver 720, and a charge pump 750. The first circuit 791 includes the differential driver 720 and the load unit 730. The second circuit 792 includes the load unit 730 and the charge pump 750.

The sense amplifier 760 generates an output signal SIGOUTC by comparing a reference voltage VREFC and a voltage difference between a first voltage of the positive signal line 711 and a second voltage of the negative signal line 712 at a falling edge of a clock signal CLK. The feedback driver 740 generates a positive feedback current FPCC and a negative feedback current FNCC based on the output signal SIGOUTC, and provides the positive feedback current FPCC and the negative feedback current FNCC to the positive signal line 711 and the negative signal line 712, respectively. The feedback driver 740 may have the same or similar structure with the feedback driver 140 of FIG. 4.

The load unit 730 includes a first capacitor and a second capacitor. The first voltage is a voltage between two terminals of the first capacitor. The second voltage is a voltage between two terminals of the second capacitor. The load unit 730 discharges the first and second capacitors during a pre-charge period. The clock signal CLK is deactivated during the pre-charge period. The load unit 730 charges the first capacitor with a positive input current PICC from the differential driver 720 and a first current LC1C from the positive signal line 711 during a normal period. The clock signal CLK is activated during the normal period. The load unit 730 charges the second capacitor with a negative input current NICC from the differential driver 720 and a second current LC2C from the negative signal line 712 during the normal period. The load unit 730 may be understood based on the descriptions provided above with reference to FIG. 2.

The process compensator 780 provides a first process compensation signal PCS1 and a second process compensation signal PCS2 to the differential driver 720 and the charge pump 750, respectively. The process compensator 780 adjusts the first process compensation signal PCS1 and the second process compensation signal PCS2 during an initialization period until a ratio of logic high values, which are outputted as the output signal SIGOUTC, to logic low values, which are outputted as the output signal SIGOUTC, becomes equal to a certain ratio. The process compensator 780 includes a first register R1 and a second register R2. The first register R1 stores the first process compensation signal PCS1. The second register R2 stores the second process compensation signal PCS2.

In an example embodiment, the process compensator 780 may increase values of the first and second process compensation signals PCS1, PCS2 when the ratio of the logic high values to the logic low values is smaller than the certain ratio. The process compensator 780 may decrease the values of the first and second process compensation signals PCS1, PCS2 when the ratio of the logic high values to the logic low values is greater than the certain ratio.

The differential driver 720 maintains a difference between the first voltage and the second voltage at a last time point of the normal period to be equal to or greater than the reference voltage VREFC by adjusting strength of the positive input current PICC corresponding to a positive input signal INPC and strength of the negative input current NICC corresponding to a negative input signal INNC based on the first process compensation signal PCS1 during the initialization period, and by re-adjusting the strength of the positive input current PICC and the strength of the negative input current NICC based on a temperature signal TSC during an operation period including the pre-charge period and the normal period. In an example embodiment, the above operations may be performed after the initialization period.

The charge pump 750 provides a positive offset voltage POVC and a negative offset voltage NOVC to the positive signal line 711 and the negative signal line 712, respectively. An average voltage of the first voltage and the second voltage at the last time point of the normal period may be maintained at a first value irrespective to a process variation and a value of the temperature signal TSC by adjusting the positive offset voltage POVC and the negative offset voltage NOVC based on the second process compensation signal PCS2 during the initialization period, and by re-adjusting the positive offset voltage POVC and the negative offset voltage NOVC based on the temperature signal TSC during the operation period.

In an example embodiment, the decision feedback equalizer 700 may further include a temperature detector 770 which generates the temperature signal TSC based on detected temperature. For example, the temperature detector 770 may generate the temperature signal TSC to have an increased value according to an increase of the detected temperature.

Figure 12:
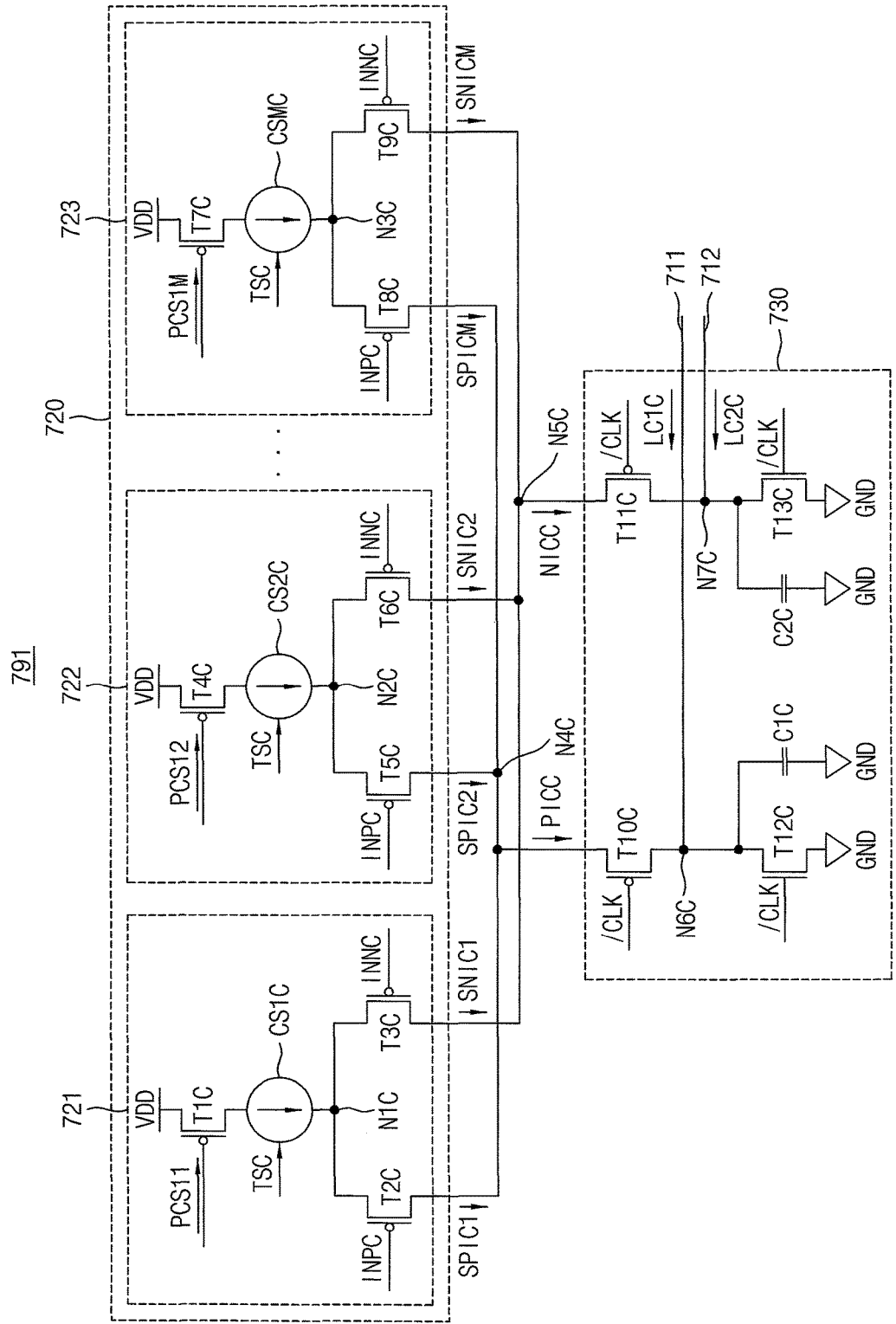
FIG. 12 is a block diagram illustrating a first circuit included in the decision feedback equalizer of FIG. 11.

FIG. 12 is a block diagram illustrating the first circuit included in the decision feedback equalizer of FIG. 11.

Referring to FIG. 12, the first circuit 791 includes the differential driver 720 and the load unit 730. The load unit 730 may have the same or similar structure with the load unit 130 included in the first circuit 180 of FIG. 2. The differential driver 720 may include first through (M)-th sub differential driving blocks 721, 722 through 723 (M is a natural number).

The first through (M)-th positive sub input currents SPIC1, SPIC2 through SPICM may be outputted as the positive input current PICC through a fourth node N4C. The first through (M)-th negative sub input currents SNIC1, SNIC2 through SNICM may be outputted as the negative input signal NICC through a fifth node N5C. The first process compensation signal PCS1 may include first through (M)-th process compensation bit signals PCS11, PCS12 through PCS1M.

The first sub differential driving block 721 may include first through third transistors T1C, T2C, and T3C and a first current source CS1C. A source terminal of the first transistor T1C may receive a supply voltage VDD, a gate terminal of the first transistor T1C may receive the first process compensation bit signal PCS11, a drain terminal of the first transistor T1C may be connected to a terminal of the first current source CS1C, and another terminal of the first current source CS1C may be connected to a first node N1C. A source terminal of the second transistor T2C may be connected to the first node N1C, a gate terminal of the second transistor T2C may receive the positive input signal INPC, and a drain terminal of the second transistor T2C may output the first positive sub input current SPIC1. A source terminal of the third transistor T3C may be connected to the first node N1C, a gate terminal of the third transistor T3C may receive the negative input signal INNC, and a drain terminal of the third transistor T3C may output the first negative sub input current SNIC1. Strength of the first current source CS1C may be controlled based on the temperature signal TSC.

The second sub differential driving block 722 may include fourth through sixth transistors T4C, T5C, and T6C and a second current source CS2C. A source terminal of the fourth transistor T4C may receive the supply voltage VDD, a gate terminal of the fourth transistor T4C may receive the second process compensation bit signal PCS12, a drain terminal of the fourth transistor T4C may be connected to a terminal of the second current source CS2C, and another terminal of the second current source CS2C may be connected to a second node N2C. A source terminal of the fifth transistor T5C may be connected to the second node N2C, a gate terminal of the fifth transistor T5C may receive the positive input signal INPC, and a drain terminal of the fifth transistor T5C may output the second positive sub input current SPIC2. A source terminal of the sixth transistor T6C may be connected to the second node N2C, a gate terminal of the sixth transistor T6C may receive the negative input signal INNC, and a drain terminal of the sixth transistor T6C may output the second negative sub input current SNIC2. Strength of the second current source CS2C may be controlled based on the temperature signal TSC.

The (M)-th sub differential driving block 723 may include seventh through ninth transistors T7C, T8C, and T9C and an (M)-th current source CSMC. A source terminal of the seventh transistor T7C may receive the supply voltage VDD, a gate terminal of the seventh transistor T7C may receive the (M)-th process compensation bit signal PCS1M, a drain terminal of the seventh transistor T7C may be connected to a terminal of the (M)-th current source CSMC, and another terminal of the (M)-th current source CSMC may be connected to a third node N3C. A source terminal of the eighth transistor T8C may be connected to the third node N3C, a gate terminal of the eighth transistor T8C may receive the positive input signal INPC, and a drain terminal of the eighth transistor T8C may output the (M)-th positive sub input current SPICM. A source terminal of the ninth transistor T9C may be connected to the third node N3C, a gate terminal of the ninth transistor T9C may receive the negative input signal INNC, and a drain terminal of the ninth transistor T9C may output the (M)-th negative sub input current SNICM. Strength of the (M)-th current source CSMC may be controlled based on the temperature signal TSC.

In an example embodiment, the first through ninth transistors T1C through T9C may be a PMOS transistor, respectively.

The differential driver 720 may generate the positive input current PICC and the negative input current NICC having strength proportional to the number of logic low values in the first through (M)-th process compensation bit signals PCS11 through PCS1M.

Figure 13:
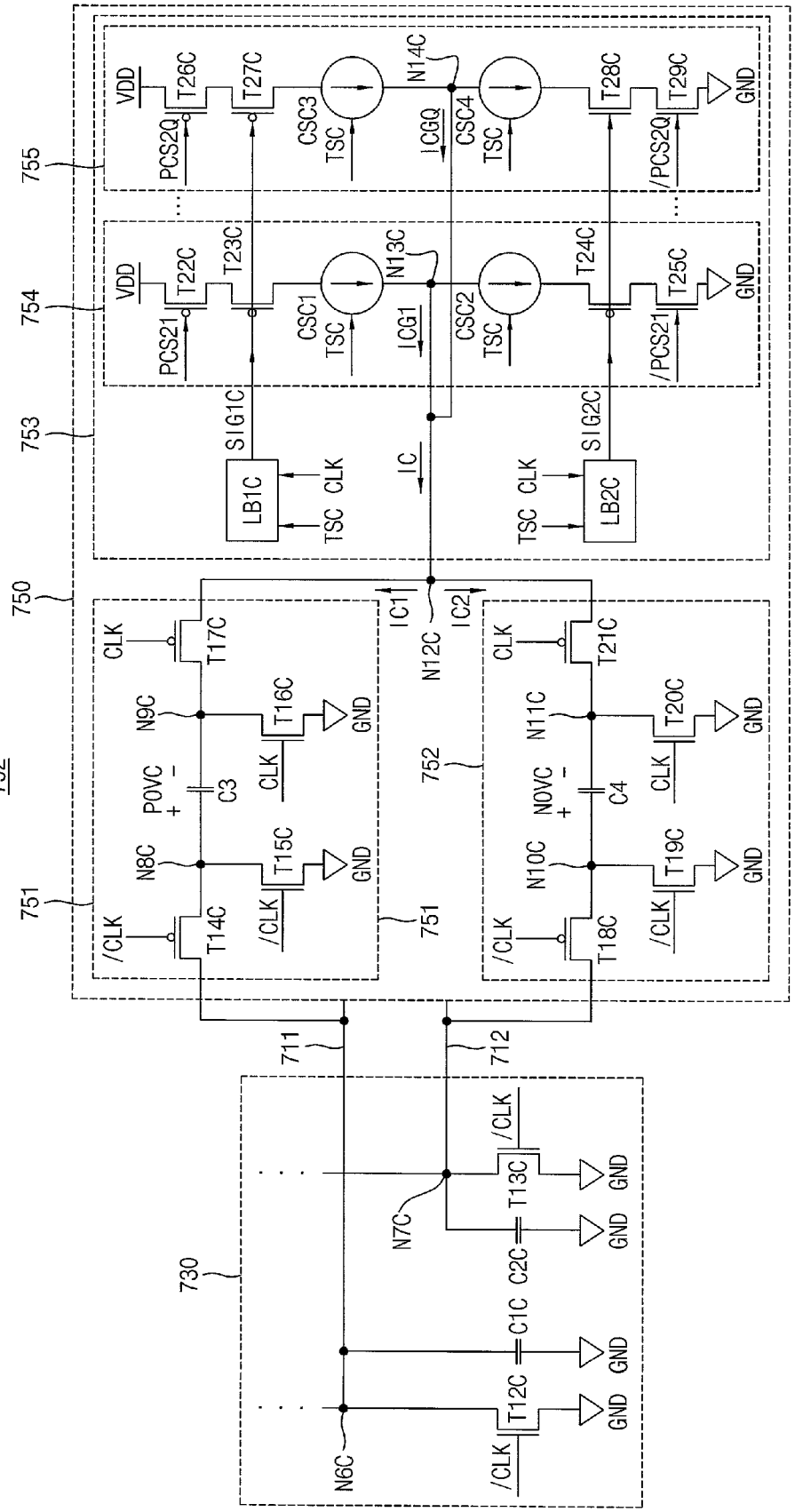
FIG. 13 is a block diagram illustrating a second circuit included in the decision feedback equalizer of FIG. 11.

FIG. 13 is a block diagram illustrating the second circuit included in the decision feedback equalizer of FIG. 11.

Referring to FIG. 13, the second circuit 792 includes the load circuit 730 and the charge pump 750. The charge pump 750 may include a current generator 753, a positive sub charge pump 751, and a negative sub charge pump 752.

The current generator 751 may generate an internal current IC corresponding to the temperature signal TSC and the second process compensation signal PCS2. The internal current IC may be divided into a positive internal current IC1 and a negative internal current IC2.

The positive sub charge pump 751 may have the same or similar structure with the positive sub charge pump 151 included in the second circuit 190 of FIG. 3. The negative sub charge pump 752 may have the same or similar structure with the negative sub charge pump 152 included in the second circuit 190 of FIG. 3.

The current generator 753 may include a first execution block LB1C, a second execution block LB2C, and first through (Q)-th current generating blocks 754 through 755 (Q is a natural number). The second process compensation signal PCS2 may include first through (Q)-th process compensation bit signals PCS21 through PCS2Q. The first through (Q)-th sub internal currents ICG1 through ICGQ may be outputted as the internal current IC through a first node N12C.

The first execution block LB1C may deactivate a first signal SIG1C when a value of the temperature signal TSC is equal to or greater than a reference value or the clock signal CLK is activated. The first execution block LB1C may activate the first signal SIG1C when the value of the temperature signal TSC is smaller than the reference value and the clock signal CLK is deactivated. The second execution block LB2C may activate a second signal SIG2C when the value of the temperature signal TSC is smaller than the reference value or the clock signal CLK is activated. The second execution block LB2C may deactivate the second signal SIG2C when the value of the temperature signal TSC is equal to or greater than the reference value and the clock signal CLK is deactivated.

The first current generating block 754 may include a first current source CSC1, a second current source CSC2, and first through fourth transistors T22C, T23C, T24C, and T25C. A source terminal of the first transistor T22C may receive a supply voltage VDD, a gate terminal of the first transistor T22C may receive the first process compensation bit signal PCS21, and a drain terminal of the first transistor T22C may be connected to a source terminal of the second transistor T23C. A gate terminal of the second transistor T23C may receive the first signal SIG1C, a drain terminal of the second transistor T23C may be connected to a terminal of the first current source CSC1, another terminal of the first current source CSC1 may be connected a second node N13C, and the first sub internal signal ICG1 may be outputted from the second node N13C. A terminal of the second current source CSC2 may be connected to the second node N13C and another terminal of the second current source CSC2 may be connected to a source terminal of the third transistor T24C. A gate terminal of the third transistor T24C may receive the second signal SIG2C and a drain terminal of the third transistor T24C may be connected to a drain terminal of the fourth transistor T25C. A gate terminal of the fourth transistor T25C may receive an inverted signal/PCS21 of the first process compensation bit signal PCS21, and a source terminal of the fourth transistor T25C may receive the ground voltage GND. Strength of the first current source CSC1 and strength of the second current source CSC2 may be controlled based on the temperature signal TSC.

The (Q)-th current generating block 755 may include a third current source CSC3, a fourth current source CSC4, and fifth through eighth transistors T26C, T27C, T28C, and T29C. A source terminal of the fifth transistor T26C may receive the supply voltage VDD, a gate terminal of the fifth transistor T26C may receive the (Q)-th process compensation bit signal PCS2Q, and a drain terminal of the fifth transistor T26C may be connected to a source terminal of the sixth transistor T27C. A gate terminal of the sixth transistor T27C may receive the first signal SIG1C, a drain terminal of the sixth transistor T27C may be connected to a terminal of the third current source CSC3, another terminal of the third current source CSC3 may be connected a third node N14C, and the (Q)-th sub internal signal ICGQ may be outputted from the third node N14C. A terminal of the fourth current source CSC4 may be connected to the third node N14C and another terminal of the fourth current source CSC4 may be connected to a drain terminal of the seventh transistor T28C. A gate terminal of the seventh transistor T28C may receive the second signal SIG2C and a source terminal of the seventh transistor T28C may be connected to a drain terminal of the eighth transistor T29C. A gate terminal of the eighth transistor T29C may receive an inverted signal /PCS2Q of the (Q)-th process compensation bit signal PCS2Q, and a source terminal of the eighth transistor T29C may receive the ground voltage GND. Strength of the third current source CSC3 and strength of the fourth current source CSC4 may be controlled based on the temperature signal TSC. An operation of the second circuit 792 may be the same or similar to operation of the second circuit 190 of FIG. 3.

The current generator 753 may generate the internal current IC having strength proportional to the number of logic low values in the first through (Q)-th process compensation bit signals PCS21 through PCS2Q.

Figure 14:
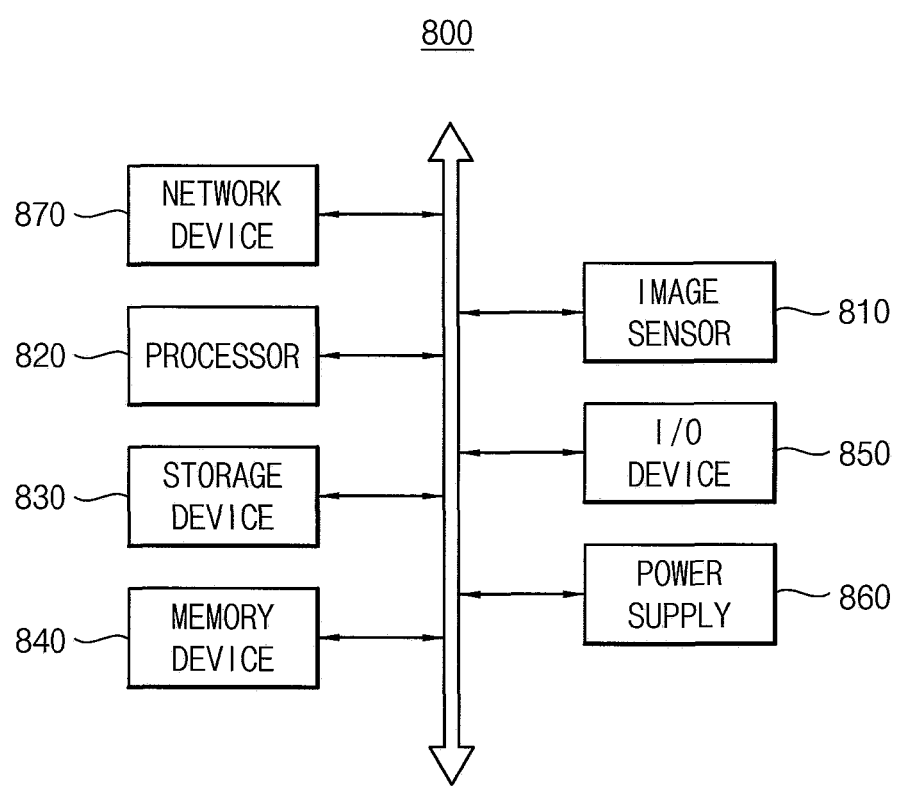
FIG. 14 is a block diagram illustrating a computing system according to an example embodiment.

FIG. 14 is a block diagram illustrating a computing system according to an example embodiment.

Referring to FIG. 14, a computing system 800 may include an image sensor 810, a storage device 830, a processor 820, a memory device 840, an input/output device 850, a network device 870, and a power supply 860.

The image sensor 810 may generate a digital signal corresponding to an incident light. The storage device 830 may store the digital signal. The processor 820 may control operations of the image sensor 810, the network device 870 and the storage device 830.

Although it is not illustrated in FIG. 14, the computing system 800 may further include ports that communicate with a video card, a sound card, a memory card, a universal serial bus (USB) device, or other electronic devices.

The processor 820 may perform various calculations or tasks. According to some example embodiments, the processor 820 may be a microprocessor or a central processing unit (CPU). The processor 820 may communicate with the storage device 830, the memory device 840, the network device 870, and the input/output device 850 via an address bus, a control bus, and/or a data bus. In some example embodiments, the processor 820 may be coupled to an extended bus, such as a peripheral component interconnection (PCI) bus.

The storage device 830 may include a non-volatile memory device such as a flash memory device, a solid state drive (SSD), a hard disk drive (HDD), a compact disk read-only memory (CD-ROM) drive, etc.

The memory device 840 may store data used to operate the electronic device 800. The memory device 840 may be a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The input/output device 850 may include a keyboard, a mouse, a printer, a display device, etc. The power supply 860 may supply operational power.

The image sensor 810 may be connected to the processor 820 through one or more buses and/or other communication links to communicate with the processor 820. The image sensor 810 may include a pixel array that detects incident light to generate an analog signal, and an analog-digital converter that performs a sigma-delta analog-digital conversion and a cyclic analog-digital conversion with respect to the analog signal to generate a digital signal in a first operation mode and performs a single-slope analog-digital conversion with respect to the analog signal to generate the digital signal in a second operation mode.

The image sensor 810 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The network device 870 may include at least one of the decision feedback equalizers 100, 400, and 700 of FIGS. 1, 7, and 11. The network device 870 may transmit data of the processor 820, the image sensor 810, the storage device 830, the memory device 840, and the input/output device 850 to another computing system. The network device 870 may receive data from the other computing system.

According to example embodiments, the image sensor 810 may be integrated with the processor 820 in one chip, or the image sensor 810 and the processor 820 may be implemented as separate chips.

The computing system 800 may be any computing system using an image sensor. For example, the computing system 800 may include a digital camera, a mobile phone, a smart phone, a portable multimedia player (PMP), a personal digital assistant (PDA), etc.

Figure 15:
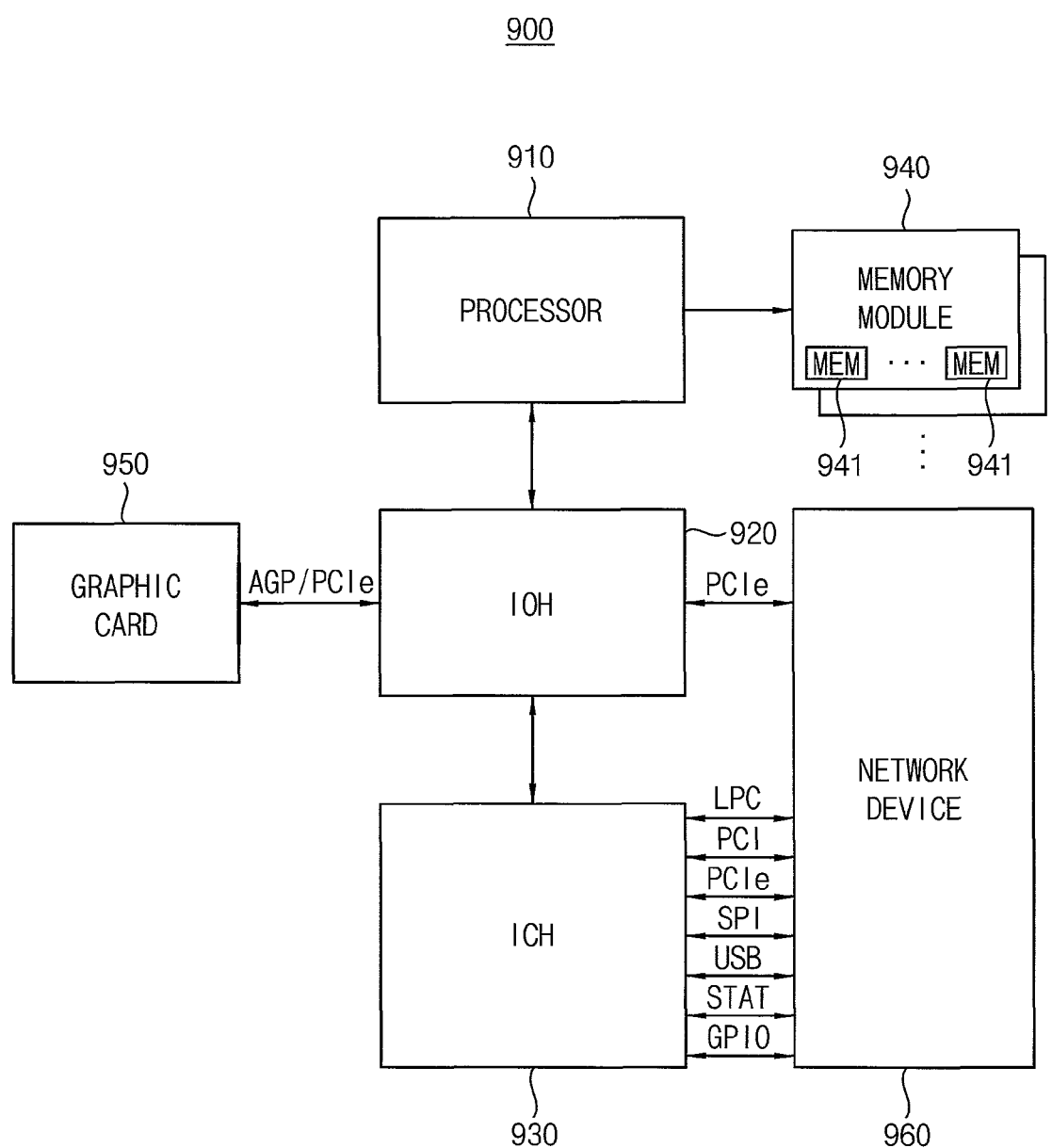
FIG. 15 is a block diagram illustrating a computing system according to another example embodiment.

FIG. 15 is a block diagram illustrating a computing system according to another example embodiment.

Referring to FIG. 15, a computing system 900 includes a processor 910, an input/output hub (IOH) 920, an input/output controller hub (ICH) 930, at least one memory module 940, a network device 960 and a graphics card 950. In some example embodiments, the computing system 900 may be a personal computer (PC), a server computer, a workstation, a laptop computer, a mobile phone, a smart phone, a personal digital assistant (PDA), a portable multimedia player (PMP), a digital camera, a digital television, a set-top box, a music player, a portable game console, a navigation system, etc.

The processor 910 may perform various computing functions, such as executing specific software for performing specific calculations or tasks. For example, the processor 910 may be a microprocessor, a central process unit (CPU), a digital signal processor, or the like. In some example embodiments, the processor 910 may include a single core or multiple cores. For example, the processor 910 may be a multi-core processor, such as a dual-core processor, a quad-core processor, a hexa-core processor, etc. Although FIG. 15 illustrates the computing system 900 including one processor 910, in some example embodiments, the computing system 900 may include a plurality of processors.

The processor 910 may include a memory controller for controlling operations of the memory module 940. The memory controller included in the processor 910 may be referred to as an integrated memory controller (IMC). A memory interface between the memory controller and the memory module 940 may be implemented using a single channel including a plurality of signal lines, or may bay be implemented using multiple channels, to each of which at least one memory module 940 may be coupled. In some example embodiments, the memory controller may be located inside the input/output hub 920. The input/output hub 920 including the memory controller may be referred to as a memory controller hub (MCH).

The memory module 940 may include a plurality of memory devices 941 that store data provided from the memory controller.

The input/output hub 920 may manage data transfer between processor 910 and devices, such as the graphics card 950. The input/output hub 920 may be coupled to the processor 910 via various interfaces. For example, the interface between the processor 910 and the input/output hub 920 may be a front side bus (FSB), a system bus, a HyperTransport, a lightning data transport (LDT), a Quick-Path interconnect (QPI), a common system interface (CSI), etc. The input/output hub 920 may provide various interfaces with the devices. For example, the input/output hub 920 may provide an accelerated graphics port (AGP) interface, a peripheral component interface-express (PCIe), a communications streaming architecture (CSA) interface, etc. Although FIG. 15 illustrates the computing system 900 including one input/output hub 920, in some example embodiments, the computing system 900 may include a plurality of input/output hubs.

The graphics card 950 may be coupled to the input/output hub 920 via AGP or PCIe. The graphics card 950 may control a display device for displaying an image. The graphics card 950 may include an internal processor for processing image data and an internal memory device. In some example embodiments, the input/output hub 920 may include an internal graphics device along with or instead of the graphics card 950. The graphics device included in the input/output hub 920 may be referred to as integrated graphics. Further, the input/output hub 920 including the internal memory controller and the internal graphics device may be referred to as a graphics and memory controller hub (GMCH).

The input/output controller hub 930 may perform data buffering and interface arbitration to efficiently operate various system interfaces. The input/output controller hub 930 may be coupled to the input/output hub 920 via an internal bus, such as a direct media interface (DMI), a hub interface, an enterprise Southbridge interface (ESI), PCIe, etc.

The input/output controller hub 930 may provide various interfaces with peripheral devices. For example, the input/output controller hub 930 may provide a universal serial bus (USB) port, a serial advanced technology attachment (SATA) port, a general purpose input/output (GPIO), a low pin count (LPC) bus, a serial peripheral interface (SPI), PCI, PCIe, etc.

The network device 960 may include at least one of the decision feedback equalizers 100, 400, and 700 of FIGS. 1, 7, and 10. The network device 960 may receive data of the processor 910 and the graphics card 950 through the PCI express of the input/output hub 920 or one of the USB port, the SATA port, the GPIO, the LPC bus, the SPI, the PCI, and the PCIe. The network device 960 may transmit the data to another computing system. The network device 960 may receive other data from the other computing system.

In some example embodiments, the processor 910, the input/output hub 920 and the input/output controller hub 930 may be implemented as separate chipsets or separate integrated circuits. In other example embodiments, at least two of the processor 910, the input/output hub 920 and the input/output controller hub 930 may be implemented as a single chipset.

As described above, the decision feedback equalizer according to example embodiments may output a correct result irrespective to temperature variation and process variation by adjusting a voltage difference between differential voltages inputted to the sense amplifier.

Although a few embodiments have been shown and described, it would be appreciated by those skilled in the art that changes may be made in the example embodiments without departing from the principles and spirit of the disclosure, the scope of which is defined in the claims and their equivalents.

What is claimed is:

1. A decision feedback equalizer comprising:
    a positive signal line and a negative signal line;
    a sense amplifier configured to generate an output signal by comparing a reference voltage and a voltage difference between a first voltage of the positive signal line and a second voltage of the negative signal line at a falling edge of a clock signal;
    a feedback driver configured to provide a positive feedback current and a negative feedback current to the positive signal line and the negative signal line, respectively, based on the output signal;

a load unit comprising a first capacitor and a second capacitor and configured to discharge the first and second capacitors during a pre-charge period in which the clock signal is deactivated, charge the first capacitor with a first current from the positive signal line and a positive input current corresponding to a positive input signal during a normal period in which the clock signal is activated, and charge the second capacitor with a second current from the negative signal line and a negative input current corresponding to a negative input signal during the normal period, the first voltage being applied across the first capacitor and the second voltage being applied across the second capacitor;

a differential driver configured to maintain a difference between the first voltage and the second voltage at a last time point of the normal period to be equal to or greater than the reference voltage by adjusting strength of the positive input current and strength of the negative input current based on a temperature signal generated according to detected temperature; and a charge pump configured to provide a positive offset voltage and a negative offset voltage to the positive signal line and the negative signal line, respectively, in the normal period to maintain an average voltage of the first voltage and the second voltage at the last time point of the normal period at a first value.

2. The decision feedback equalizer of claim 1, wherein the differential driver comprises a current source, a first transistor, and a second transistor, wherein a first terminal of the current source receives a supply voltage, a second terminal of the current source is connected to a first node, and strength of the current source is controlled based on the temperature signal, wherein a source terminal of the first transistor is connected to the first node, a gate terminal of the first transistor receives the positive input signal, and a drain terminal of the first transistor outputs the positive input current, and wherein a source terminal of the second transistor is connected to the first node, a gate terminal of the second transistor receives the negative input signal, and a drain terminal of the second transistor outputs the negative input current.

3. The decision feedback equalizer of claim 2, wherein the strength of the current source increases according to an increase of a value of the temperature signal.

4. The decision feedback equalizer of claim 2, wherein the strength of the positive input current and the strength of the negative input current increase according to an increase of a value of the temperature signal.

5. The decision feedback equalizer of claim 1, wherein the positive signal line and the negative signal line are driven to a ground voltage during the pre-charge period.

6. The decision feedback equalizer of claim 1, further comprising a temperature detector configured to generate the temperature signal based on the detected temperature.

7. The decision feedback equalizer of claim 1, wherein the sense amplifier is configured to output the output signal having a logic high value at the falling edge of the clock signal when a value, which is obtained by subtracting the first voltage from the second voltage, is equal to or greater than the reference voltage, and wherein the sense amplifier is configured to output the output signal having a logic low value at the falling edge of the clock signal when the value is smaller than the reference voltage.

8. A decision feedback equalizer comprising:

a positive signal line and a negative signal line;

a sense amplifier configured to generate an output signal by comparing a reference voltage and a voltage difference between a first voltage of the positive signal line and a second voltage of the negative signal line at a falling edge of a clock signal;

a feedback driver configured to provide a positive feedback current and a negative feedback current to the positive signal line and the negative signal line, respectively;

a load unit comprising a first capacitor and a second capacitor and configured to discharge the first and second capacitors during a pre-charge period in which the clock signal is deactivated, charge the first capacitor with a first current from the positive signal line and a positive input current during a normal period in which the clock signal is activated, and charge the second capacitor with a second current from the negative signal line and a negative input current corresponding to a negative input signal during the normal period, the first voltage being applied across the first capacitor and the second voltage being applied across the second capacitor;

a differential driver configured to maintain a difference between the first voltage and the second voltage at a last time point of the normal period to be equal to or greater than the reference voltage by adjusting strength of the positive input current and strength of the negative input current based on a first process compensation signal during an initialization period, and by re-adjusting the strength of the positive input current and the strength of the negative input current based on the temperature signal, which is generated according to detected temperature, during an operation period, the operation period comprising the pre-charge period and the normal period;

a charge pump configured to provide a positive offset voltage and a negative offset voltage to the positive signal line and the negative signal line respectively, in the normal mode, and configured to maintain an average voltage of the first voltage and the second voltage at the last time point of the normal period at a first value by adjusting the positive offset voltage and the negative offset voltage based on a second process compensation signal during the initialization period, and by re-adjusting the positive offset voltage and the negative offset voltage based on the temperature signal during the operation period; and a process compensator configured to adjust the first process compensation signal and the second process compensation signal during the initialization period until a ratio of logic high values of the output signal to logic low values of the output signal becomes a certain ratio.

9. The decision feedback equalizer of claim 8, wherein the process compensator is configured to increase values of the first and second process compensation signals when the ratio of the logic high values to the logic low values of the output signal is smaller than the certain ratio, wherein the process compensator is configured to decrease the values of the first and second process compensation signals when the ratio of the logic high values to the logic low values is greater than the certain ratio.

10. The decision feedback equalizer of claim 8, wherein the process compensator comprises:
   a first register configured to store the first process compensation signal; and
   a second register configured to store the second process compensation signal.

11. The decision feedback equalizer of claim 8, wherein first through (M)-th positive sub input currents (M being a natural number) are outputted as the positive input current through a first node, first through (M)-th negative sub input currents are outputted as the negative input signal through a second node, the first process compensation signal comprises first through (M)-th process compensation bit signals, and the differential driver comprises first through (M)-th sub differential driving blocks,
   wherein a (P)-th sub differential driving block (P being a natural number equal to or smaller than M) activates a (P)-th positive sub input current and a (P)-th negative sub input current when a (P)-th process compensation bit signal is deactivated, and the (P)-th sub differential driving block deactivates the (P)-th positive sub input current and the (P)-th negative sub input current when the (P)-th process compensation bit signal is activated,
   wherein strength of the (P)-th positive sub input current and strength of the (P)-th negative sub input current are controlled based on the temperature signal.

12. The decision feedback equalizer of claim 11, wherein the (P)-th sub differential driving block comprises a first transistor, a second transistor, a third transistor and a current source,
   wherein a source terminal of the first transistor receives a supply voltage, a gate terminal of the first transistor receives the (P)-th process compensation bit signal, a source terminal of the first transistor is connected to a first terminal of the current source, and a second terminal of the current source is connected to a first node,
   wherein a source terminal of the second transistor is connected to the first node, a gate terminal of the second transistor receives the positive input signal, and a drain terminal of the second transistor outputs the (P)-th positive sub input current,
   wherein a source terminal of the third transistor is connected to the first node, a gate terminal of the third transistor receives the negative input signal, and a drain terminal of the third transistor outputs the (P)-th negative sub input current,
   wherein strength of the current source is controlled based on the temperature signal.

13. The decision feedback equalizer of claim 8, wherein the charge pump comprises:
   a current generator configured to generate an internal current corresponding to the temperature signal and the second process compensation signal, the internal current being divided into a positive internal current and a negative internal current;
   a positive sub charge pump comprising a third capacitor and configured to charge the third capacitor with the positive internal current during the pre-charge period such that the positive offset voltage is applied across the third capacitor, and provide the positive offset voltage to the positive signal line during the normal period; and
   a negative sub charge pump comprising a fourth capacitor and configured to charge the fourth capacitor with the negative internal current during the pre-charge period such that the negative offset voltage is applied across the fourth capacitor, and provide the negative offset voltage to the negative signal line during the normal period.

14. The decision feedback equalizer of claim 13, wherein the current generator comprises a first execution block, a second execution block, and first through (Q)-th current generating blocks (Q being a natural number),
   wherein the second process compensation signal comprises first through (Q)-th process compensation bit signals and first through (Q)-th sub internal currents are outputted as the internal current through a first node,
   wherein the first execution block is configured to deactivate a first signal when a value of the temperature signal is equal to or greater than a reference value or the clock signal is activated, and the first execution block activates the first signal when the value of the temperature signal is smaller than the reference value and the clock signal is deactivated,
   wherein the second execution block is configured to activate a second signal when the value of the temperature signal is smaller than the reference value or the clock signal is activated, and the second execution block is configured to deactivate the second signal when the value of the temperature signal is equal to or greater than the reference value and the clock signal is deactivated,
   wherein the (R)-th current generating block (R being a natural number equal to or smaller than Q) is configured to activate the (R)-th sub internal current based on the first and second signals when the (R)-th process compensation bit signal is deactivated, and the (R)-th current generating block deactivates the (R)-th sub internal current when the (R)-th process compensation bit signal is activated,
   wherein strength of the (R)-th sub internal current is controlled based on the temperature signal.

15. The decision feedback equalizer of claim 14, wherein the (R)-th current generating block comprises a first current source, a second current source, and a first through a fourth transistors,
   wherein a source terminal of the first transistor receives a supply voltage, a gate terminal of the first transistor receives the (R)-th process compensation bit signal, and a drain terminal of the first transistor is connected to a source terminal of a second transistor,
   wherein a gate terminal of the second transistor receives the first signal, a drain terminal of the second transistor is connected to a first terminal of the first current source, a second terminal of the first current source is connected a second node, and the (R)-th sub internal signal is outputted to the second node,
   wherein a first terminal of the second current source is connected to the second node and a second terminal of the second current source is connected to a source terminal of the third transistor,
   wherein a gate terminal of the third transistor receives the second signal and a drain terminal of the third transistor is connected to a drain terminal of the fourth transistor,
   wherein a gate terminal of the fourth transistor receives an inverted signal of the (R)-th process compensation bit signal, and a source terminal of the fourth transistor receives a ground voltage,
   wherein strength of the first current source and strength of the second current source are controlled based on the temperature signal.

16. A decision feedback equalizer comprising:

a sense amplifier configured to generate an output signal based on comparison between a reference voltage and a voltage difference between a first voltage of a positive signal line and a second voltage of a negative signal line at a first edge of a clock signal, wherein the first voltage and the second voltage are discharged during a pre-charge period in which the clock signal is deactivated, the first voltage is charged using a first current from the positive signal line and a positive input current corresponding to a positive input signal during a normal period in which the clock signal is activated, and the second voltage is charged using a second current from the negative signal line and a negative input current corresponding to a negative input signal during the normal period;

a differential driver configured to adjust strength of the positive input current and strength of the negative input current by using a temperature signal that is generated based on detected temperature, and configured to maintain a difference between the first voltage and the second voltage at a last time point of the normal period to be equal to or greater than the reference voltage; and a charge pump configured to provide a positive offset voltage and a negative offset voltage to the positive signal line and the negative signal line, respectively, in the normal period, the positive offset voltage and the negative offset voltage being adjusted based on the temperature signal.

17. The decision feedback equalizer of claim 16, further comprising a feedback driver configured to provide a positive feedback current and a negative feedback current to the positive signal line and the negative signal line, respectively, based on the output signal.

18. The decision feedback equalizer of claim 16, wherein the differential driver is configured to increase the strength of the positive input current and the strength of the negative input current according to an increase of a value of the temperature signal.

19. The decision feedback equalizer of claim 16, wherein the differential driver is configured to further adjust the strength of the positive input current and the strength of the negative input current based on a first process compensation signal during an initialization period, and the charge pump is configured to further adjust the positive offset voltage and the negative offset voltage based on a second process compensation signal during the initialization period.

20. The decision feedback equalizer of claim 19, further comprising:

a process compensator configured to adjust the first process compensation signal and the second process compensation signal during the initialization period until a ratio of logic high values of the output signal to logic low values of the output signal becomes a certain ratio.

\* \* \* \* \*